United States Patent [19]

Masumoto et al.

[11] Patent Number: 4,494,828
[45] Date of Patent: Jan. 22, 1985

[54] ZOOM LENS SYSTEM OF RELATIVELY HIGH ZOOM RATIO RANGING TO WIDE ANGLE PHOTOGRAPHY

[75] Inventors: Hisayuki Masumoto, Sakai; Shuji Ogino, Osaka, both of Japan

[73] Assignee: Minolta Camera Kabushiki Kaisha, Osaka, Japan

[21] Appl. No.: 366,673

[22] Filed: Apr. 8, 1982

[30] Foreign Application Priority Data

Apr. 9, 1981 [JP] Japan ................... 56-53948
Apr. 10, 1981 [JP] Japan ................... 56-54672
Jan. 26, 1982 [JP] Japan ................... 57-11090

[51] Int. Cl.$^3$ ................................ G02B 7/04
[52] U.S. Cl. ........................ 350/427; 350/423
[58] Field of Search ............ 350/423, 427, 428

[56] References Cited

U.S. PATENT DOCUMENTS 4,240,697 12/1980 Takano ........................ 350/423
4,256,381 3/1981 Kreitzer ...................... 350/423
4,299,454 11/1981 Betensky ..................... 350/427
4,303,312 12/1981 Basista ....................... 350/427

Primary Examiner—John K. Corbin
Assistant Examiner—Paul M. Dzierzynski
Attorney, Agent, or Firm—Jackson, Jones & Price

[57] ABSTRACT

A zoom lens system of a relatively high zoom ratio ranging from a telephoto to a wide field angle is provided. The zoom lens system comprises from the object to the image side a first lens group of a positive refractive power, a second lens group of a negative refractive power consisting of a first negative subgroup, a second positive subgroup located on the image side of the first negative subgroup with an air space and a third negative subgroup located on the image side of the second positive subgroup with an air space, and a third lens group of a positive refractive power, wherein at least the air space between the first and second lens groups and the air space between the second and third lens groups are changeable upon zooming. The focusing can be practiced by moving the first lens group with the other lens groups left stationary.

27 Claims, 170 Drawing Figures

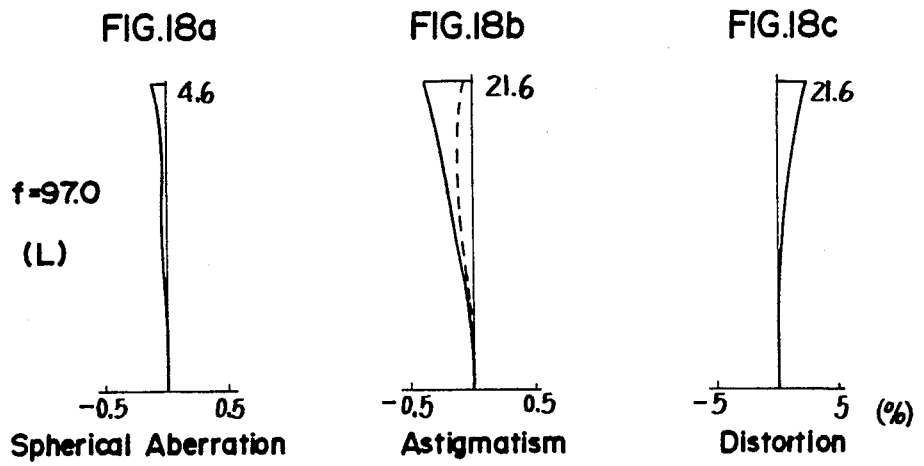
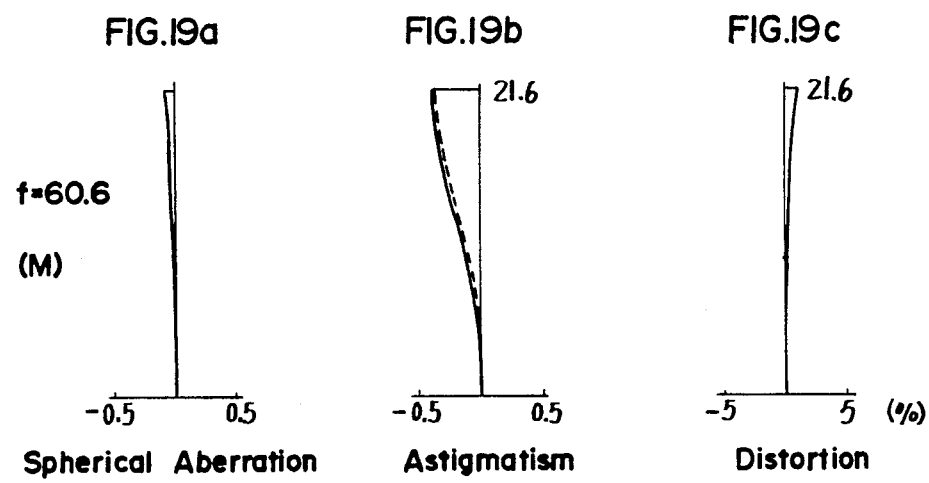
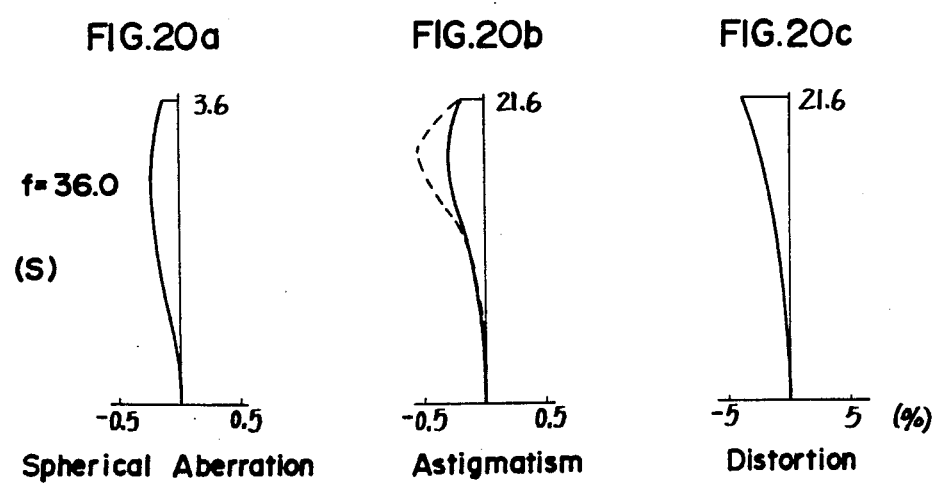

FIG.21a  FIG.21b  FIG.21c
f=97.0 (L)
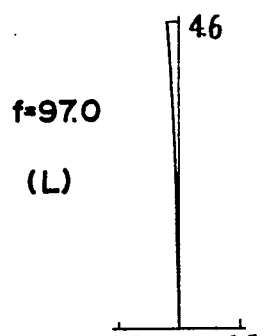 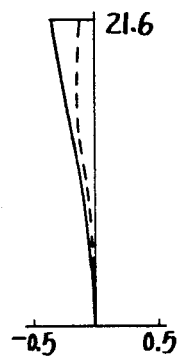 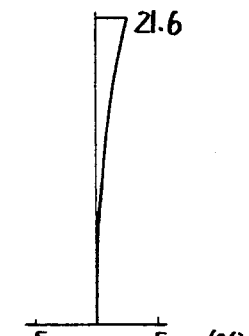
Spherical Aberration  Astigmatism  Distortion
FIG.22a  FIG.22b  FIG.22c
f=60.6 (M)
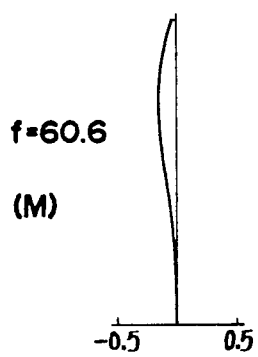 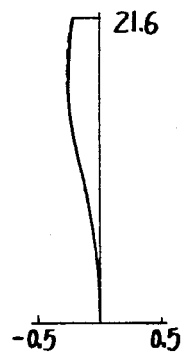 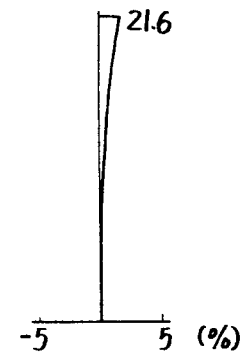
Spherical Aberration  Astigmatism  Distortion
FIG.23a  FIG.23b  FIG.23c
f=36.0 (S)
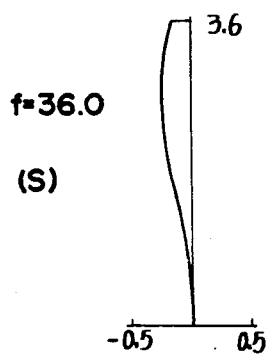 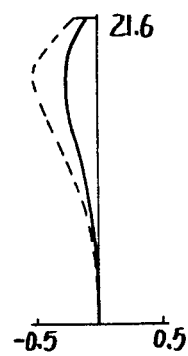 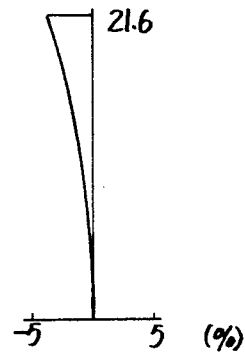
Spherical Aberration  Astigmatism  Distortion FIG.24a  FIG.24b  FIG.24c
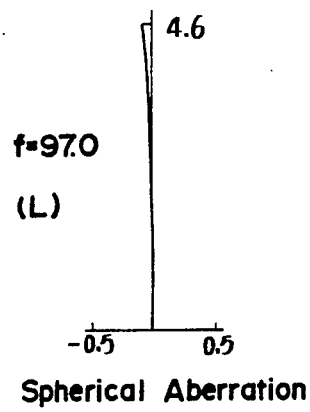 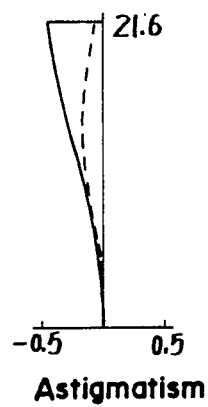 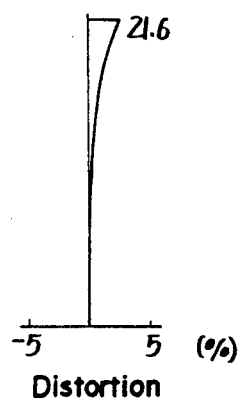
f=97.0 (L)
Spherical Aberration  Astigmatism  Distortion
FIG.25a  FIG.25b  FIG.25c
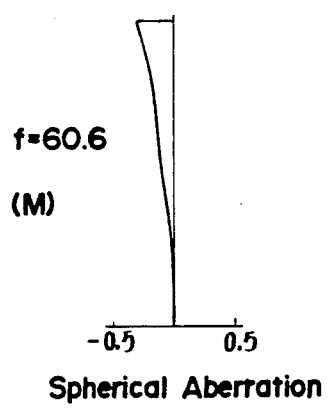 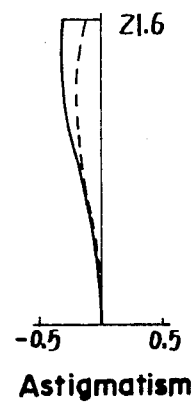 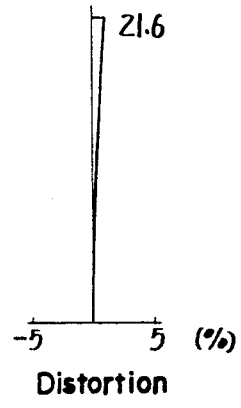
f=60.6 (M)
Spherical Aberration  Astigmatism  Distortion
FIG.26a  FIG.26b  FIG.26c
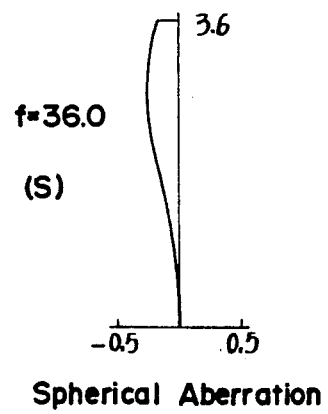 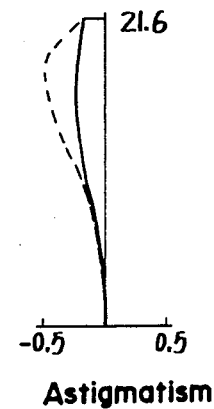 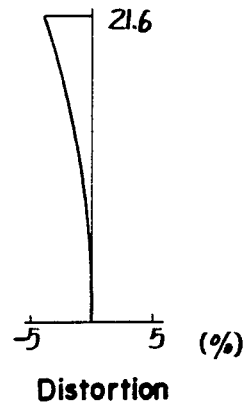
f=36.0 (S)
Spherical Aberration  Astigmatism  Distortion f=97.0

(L)

-0.5  0.5
Spherical Aberration 21.6

-0.5  0.5
Astigmatism 21.6

-5  5  (%)
Distortion f=60.0

(M)

-0.5  0.5
Spherical Aberration 21.6

-0.5  0.5
Astigmatism 21.6

-5  5  (%)
Distortion f=36.0

(S)

3.6

-0.5  0.5
Spherical Aberration 21.6

-0.5  0.5
Astigmatism 21.6

-5  5  (%)
Distortion

FIG.30a  FIG.30b  FIG.30c
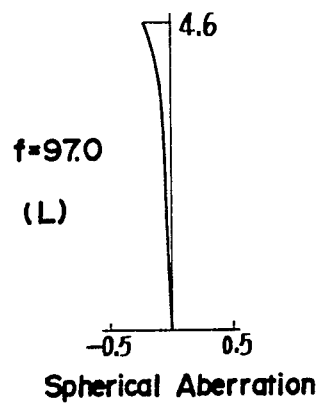
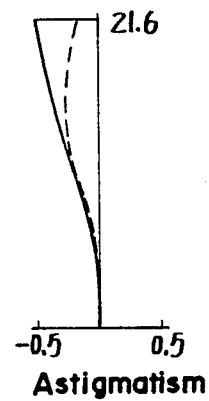
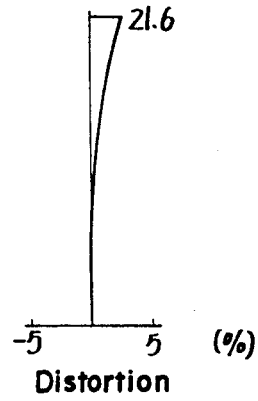
f=97.0
(L)
Spherical Aberration    Astigmatism    Distortion (%)
FIG.31a  FIG.31b  FIG.31c
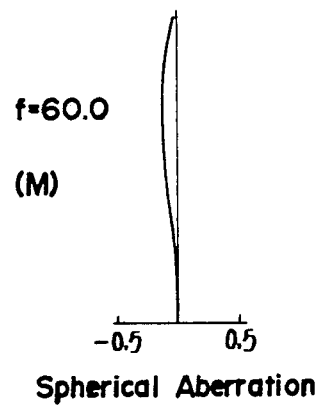
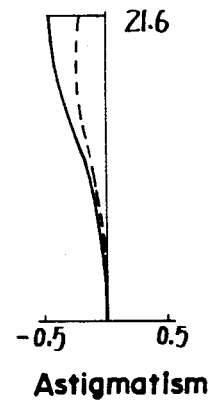
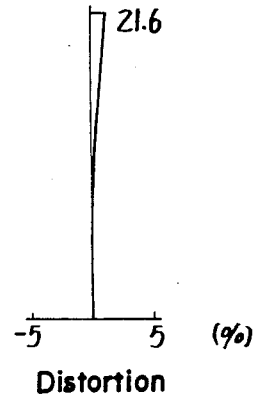
f=60.0
(M)
Spherical Aberration    Astigmatism    Distortion (%)
FIG.32a  FIG.32b  FIG.32c
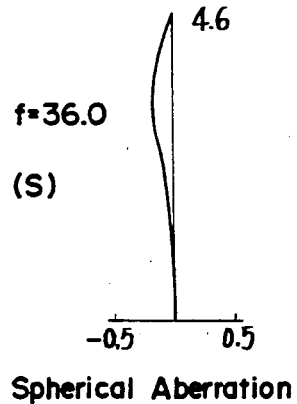
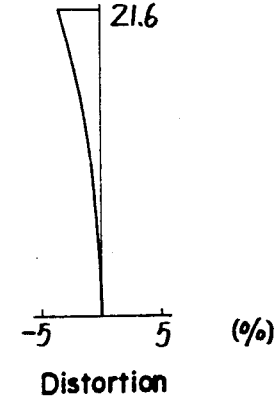
f=36.0
(S)
Spherical Aberration    Astigmatism    Distortion (%)

FIG.33a  FIG.33b  FIG.33c
f=97.0 (L)
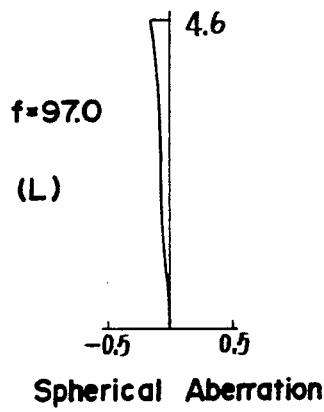 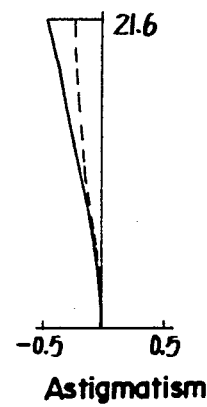 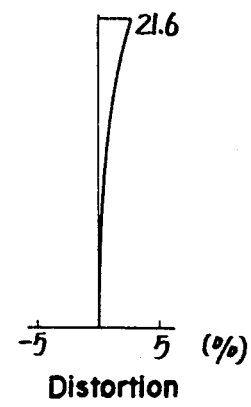
Spherical Aberration    Astigmatism    Distortion
FIG.34a  FIG.34b  FIG.34c
f=60.6 (M)
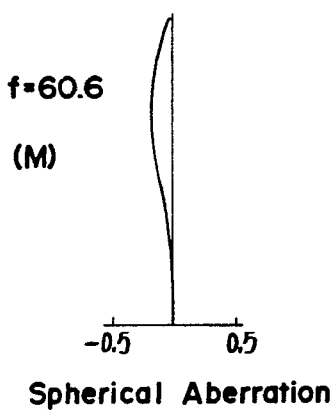 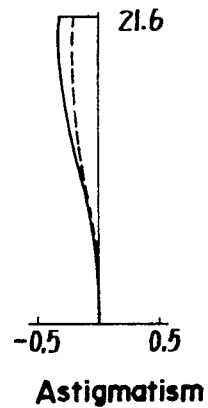 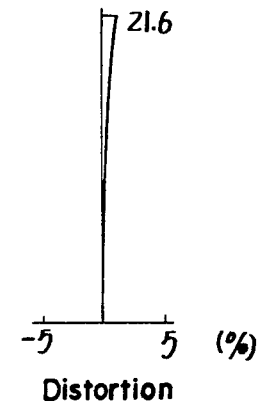
Spherical Aberration    Astigmatism    Distortion
FIG.35a  FIG.35b  FIG.35c
f=36.0 (S)
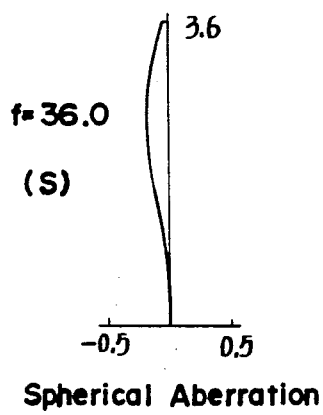 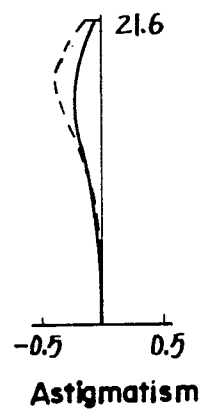 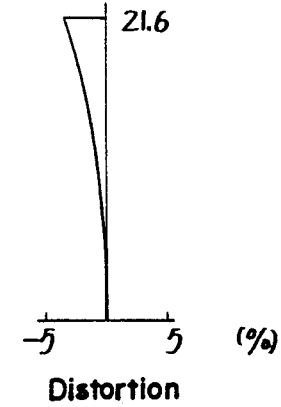
Spherical Aberration    Astigmatism    Distortion FIG.36a  FIG.36b  FIG.36c
f=82.5
(L)
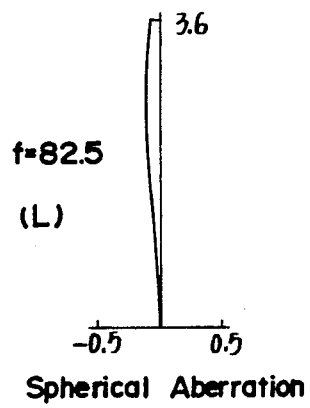 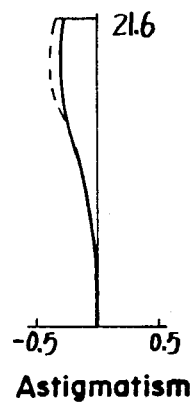 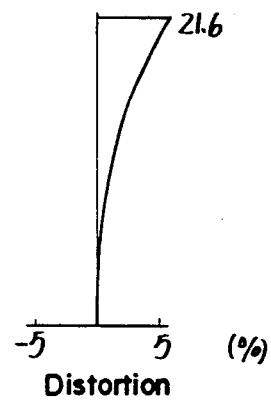
Spherical Aberration  Astigmatism  Distortion (%)
FIG.37a  FIG.37b  FIG.37c
f=50.0
(M)
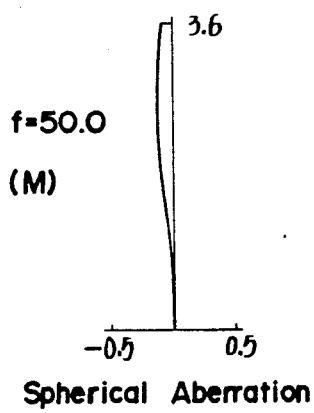 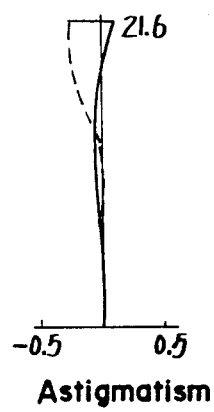 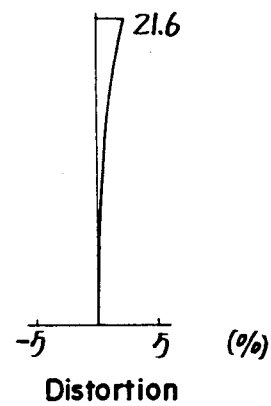
Spherical Aberration  Astigmatism  Distortion (%)
FIG.38a  FIG.38b  FIG.38c
f=36.0
(S)
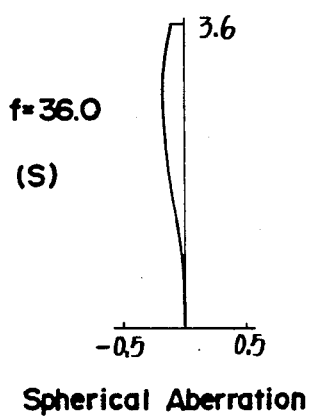 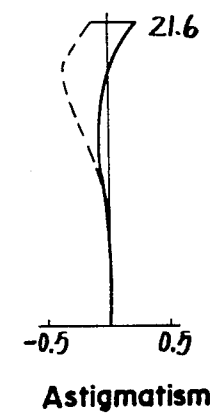 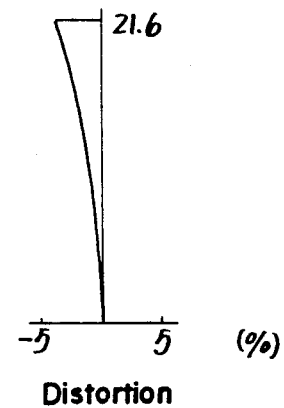
Spherical Aberration  Astigmatism  Distortion (%)

FIG.39a
FIG.39b
FIG.39c
f=102.7
(L)
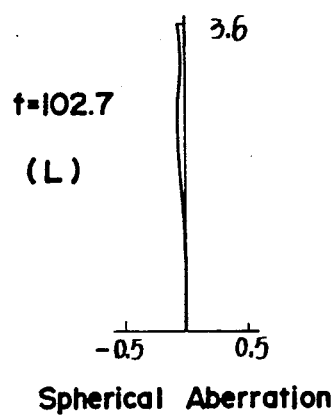
Spherical Aberration
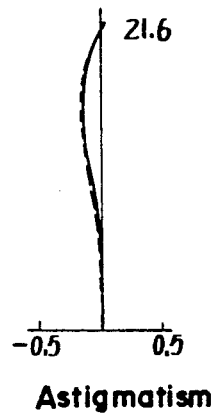
Astigmatism
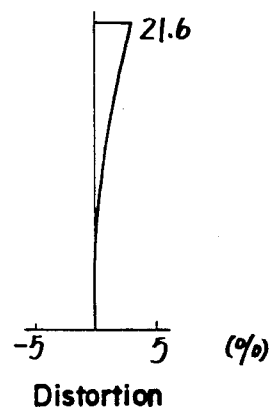
Distortion (%)
FIG.40a
FIG.40b
FIG.40c
f=60.0
(M)
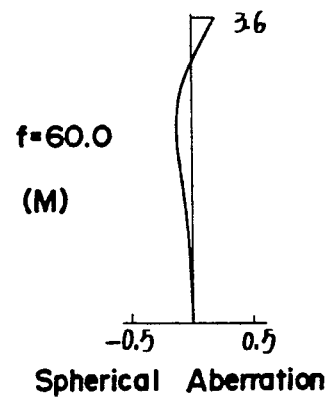
Spherical Aberration
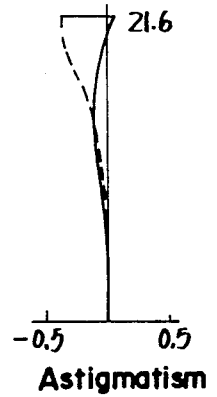
Astigmatism
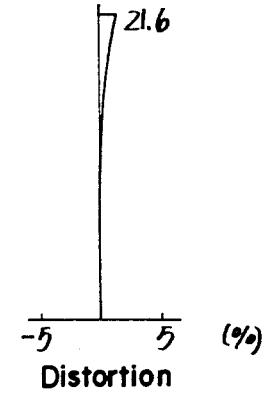
Distortion (%)
FIG.41a
FIG.41b
FIG.41c
f=35.9
(S)
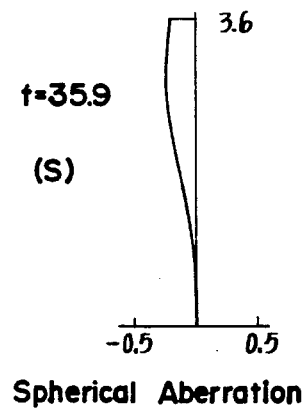
Spherical Aberration
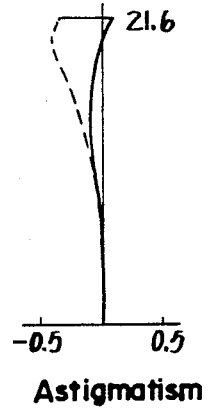
Astigmatism
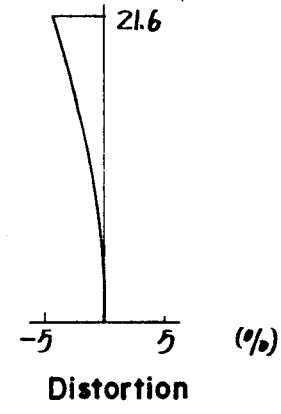
Distortion (%)

FIG.42a  FIG.42b  FIG.42c
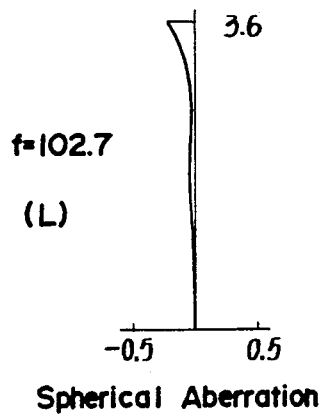
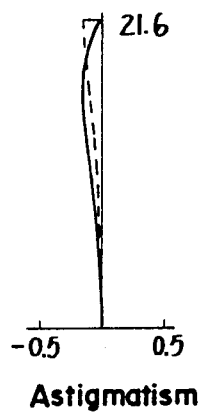
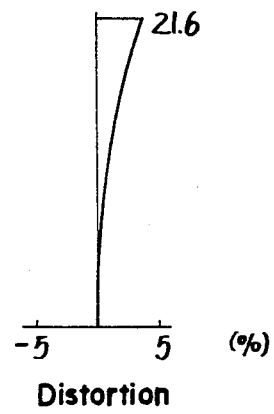
f=102.7 (L)
Spherical Aberration   Astigmatism   Distortion
FIG.43a  FIG.43b  FIG.43c
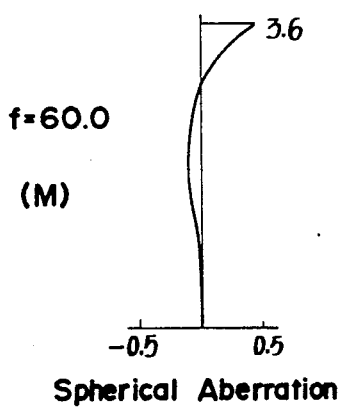
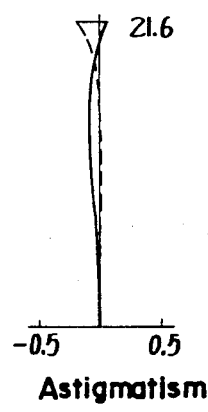
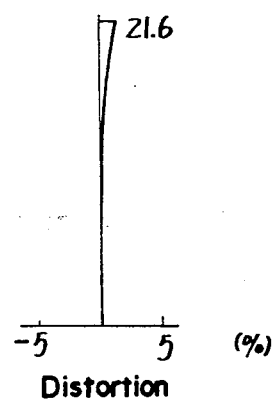
f=60.0 (M)
Spherical Aberration   Astigmatism   Distortion
FIG.44a  FIG.44b  FIG.44c
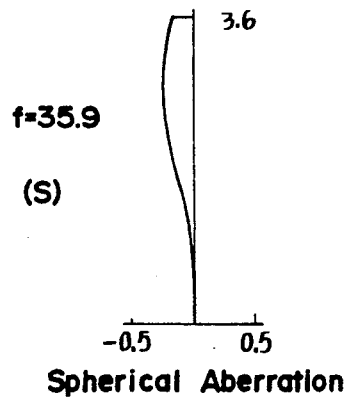
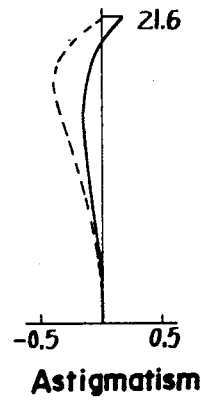
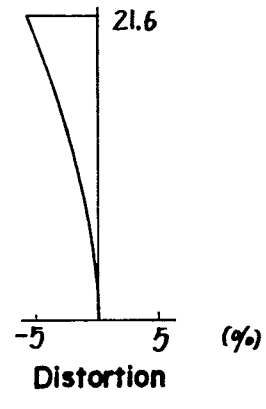
f=35.9 (S)
Spherical Aberration   Astigmatism   Distortion FIG.45a  FIG.45b  FIG.45c
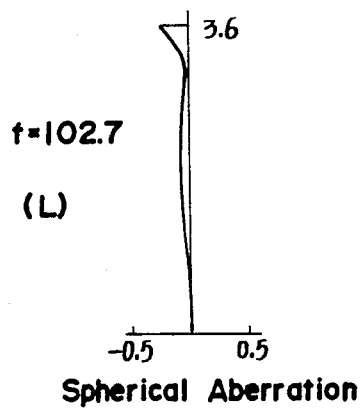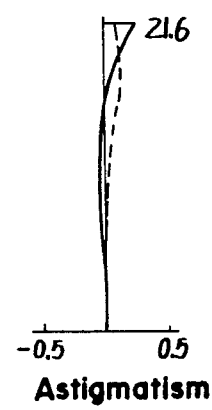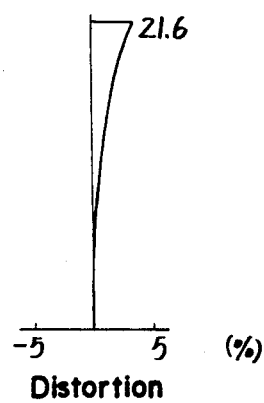
f=102.7 (L)
Spherical Aberration  Astigmatism  Distortion (%)
FIG.46a  FIG.46b  FIG.46c
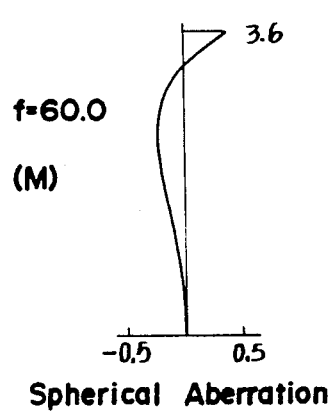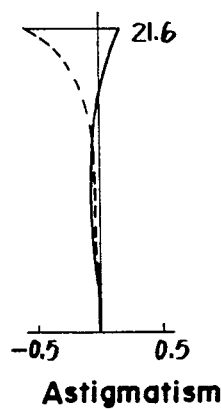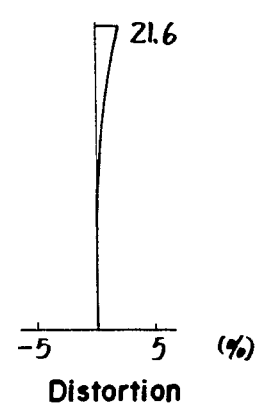
f=60.0 (M)
Spherical Aberration  Astigmatism  Distortion (%)
FIG.47a  FIG.47b  FIG.47c
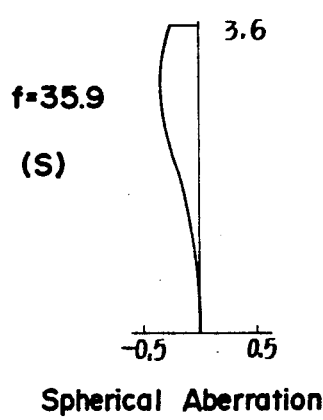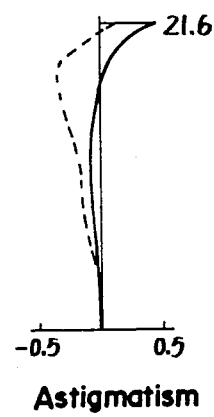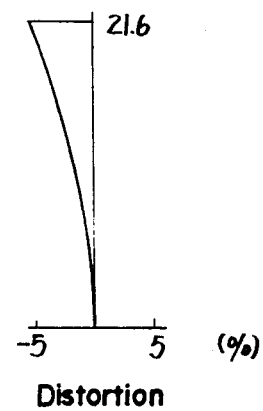
f=35.9 (S)
Spherical Aberration  Astigmatism  Distortion (%)

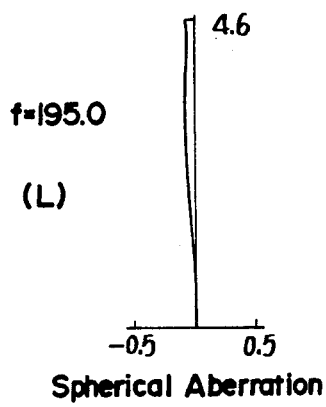
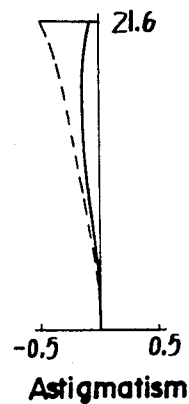
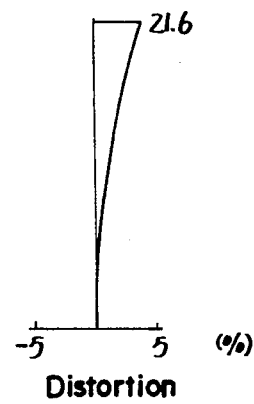
FIG.48a  FIG.48b  FIG.48c
f=195.0 (L)
Spherical Aberration — Astigmatism — Distortion
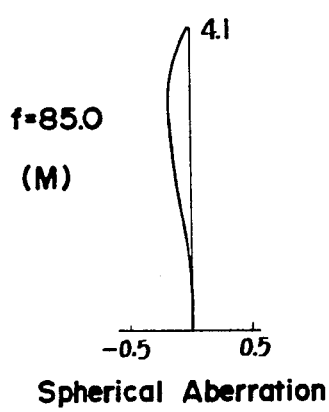
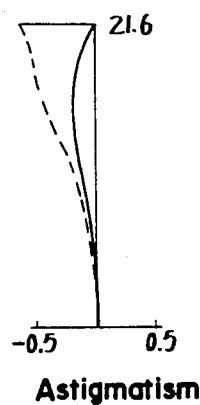
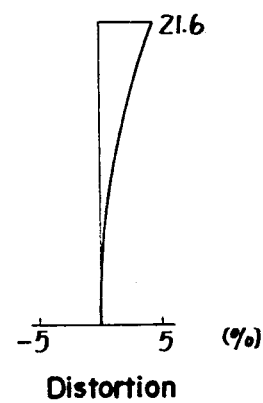
FIG.49a  FIG.49b  FIG.49c
f=85.0 (M)
Spherical Aberration — Astigmatism — Distortion
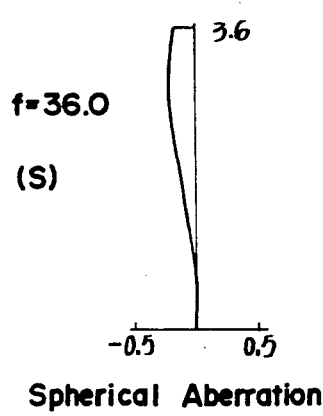
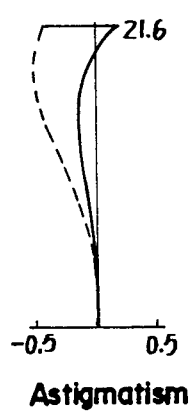
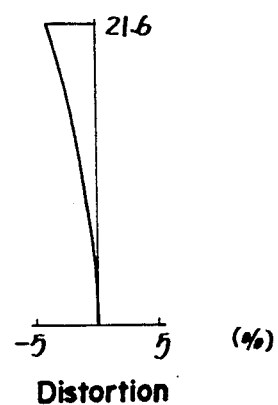
FIG.50a  FIG.50b  FIG.50c
f=36.0 (S)
Spherical Aberration — Astigmatism — Distortion

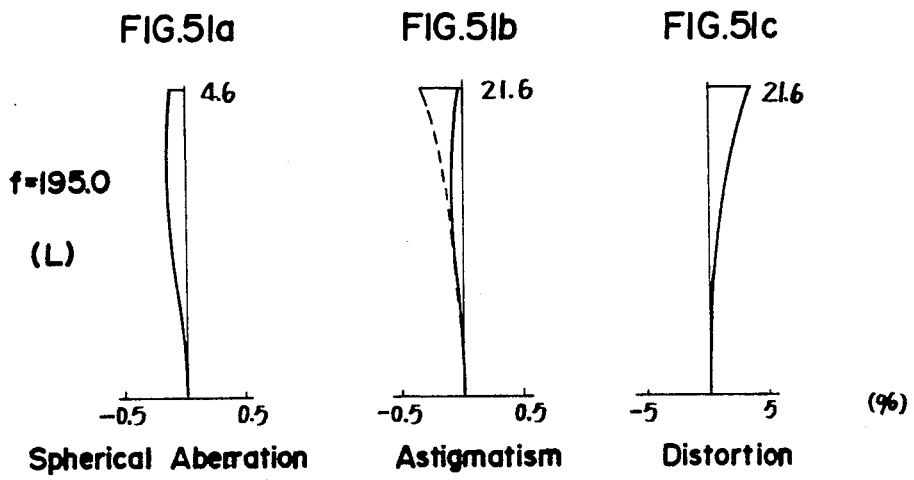
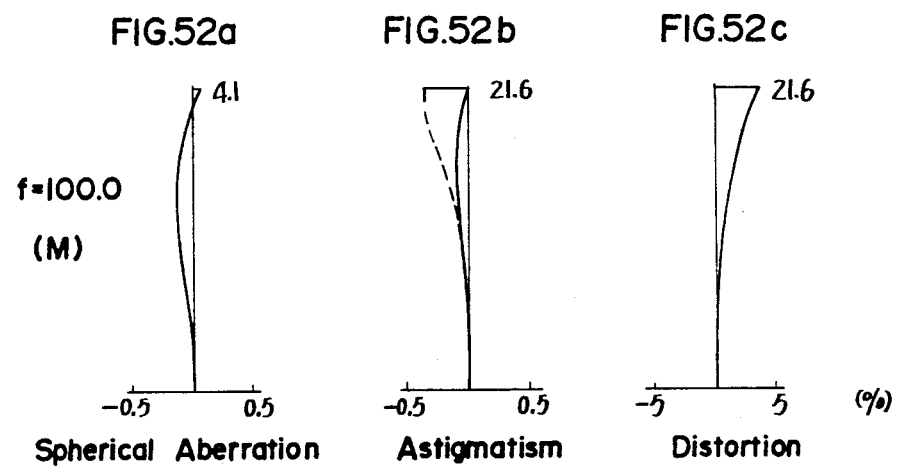
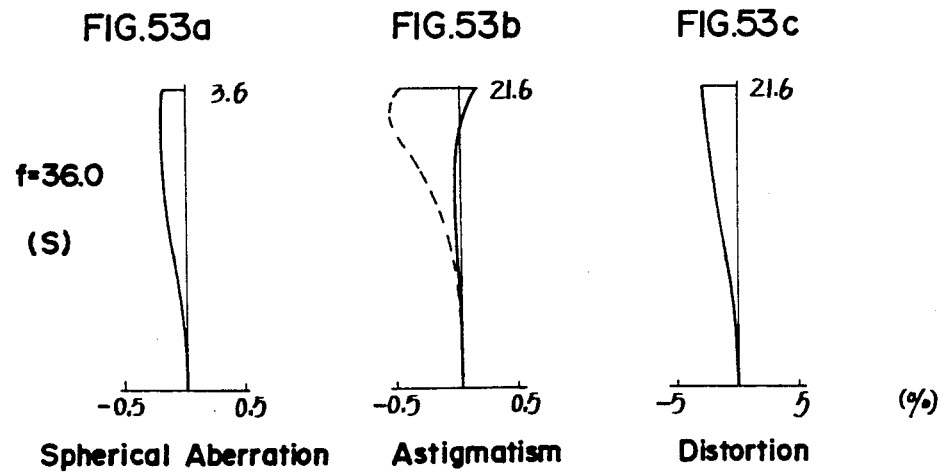

FIG.54a  FIG.54b  FIG.54c
f=195.0
(L)
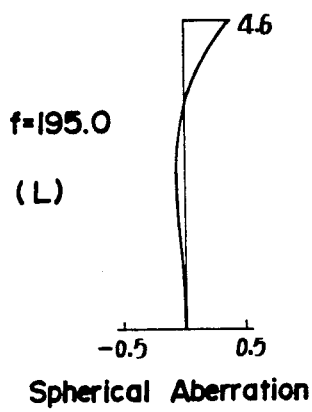
Spherical Aberration
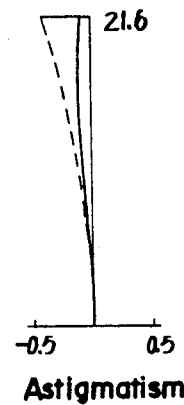
Astigmatism
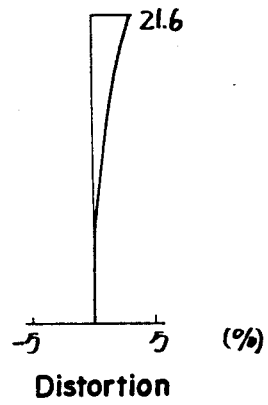
Distortion
FIG.55a  FIG.55b  FIG.55c
f=100.0
(M)
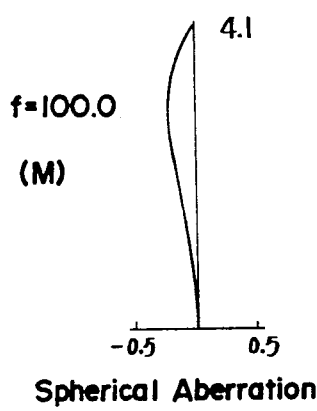
Spherical Aberration
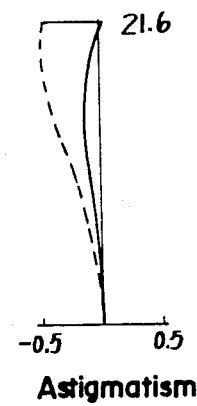
Astigmatism
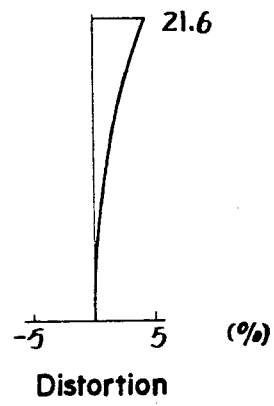
Distortion
FIG.56a  FIG.56b  FIG.56c
f=36.0
(S)
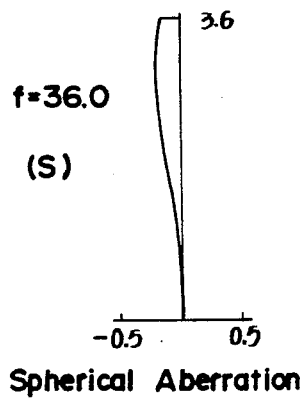
Spherical Aberration
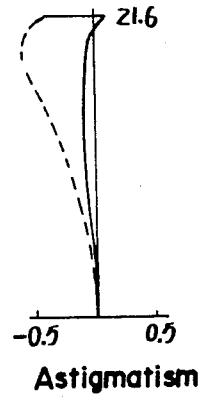
Astigmatism
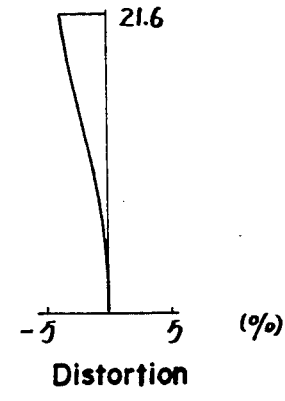
Distortion f=195.0
(L)

4.6

−0.5  0.5
Spherical Aberration 21.6

−0.5  0.5
Astigmatism 21.6

−5  5  (%)
Distortion f=100.0
(M)

4.3

−0.5  0.5
Spherical Aberration 21.6

−0.5  0.5
Astigmatism 21.6

−5  5  (%)
Distortion f=36.0
(S)

4.1

−0.5  0.5
Spherical Aberration 21.6

−0.5  0.5
Astigmatism 21.6

−5  5  (%)
Distortion

FIG.60a
FIG.60b
FIG.60c
f=145.5 (L)
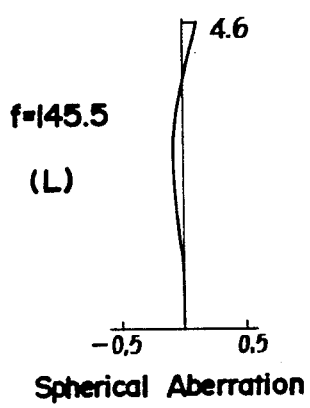
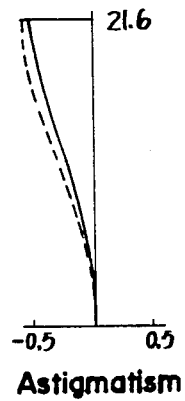
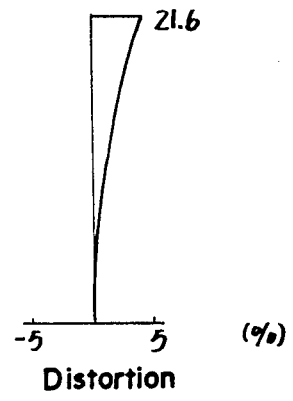
Spherical Aberration  Astigmatism  Distortion (%)
FIG.61a
FIG.61b
FIG.61c
f=70.0 (M)
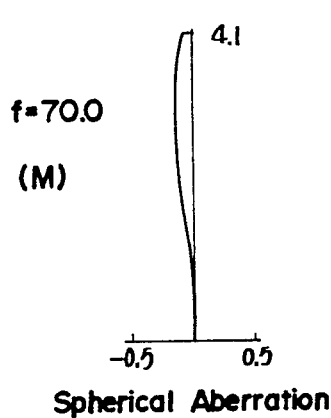
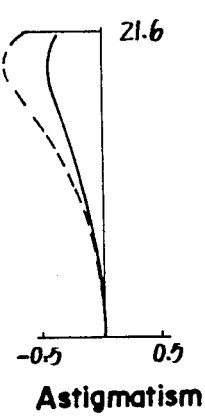
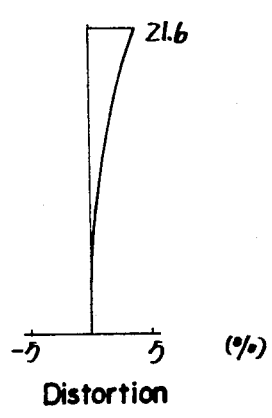
Spherical Aberration  Astigmatism  Distortion (%)
FIG.62a
FIG.62b
FIG.62c
f=35.9 (S)
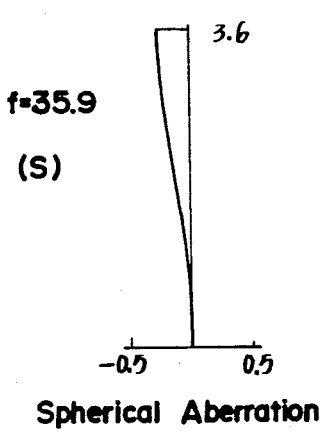
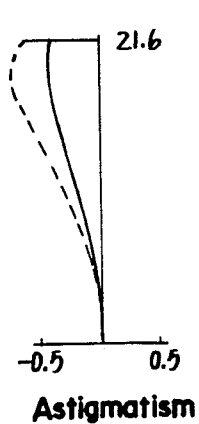
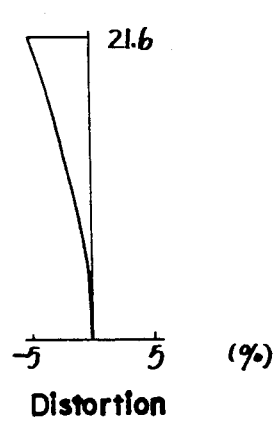
Spherical Aberration  Astigmatism  Distortion (%)

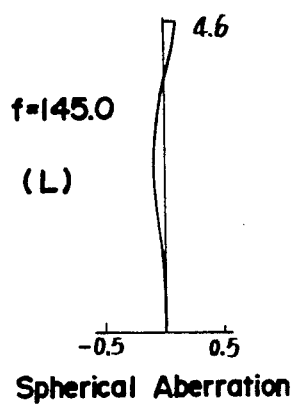
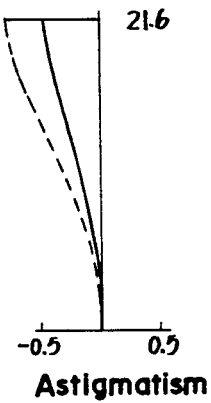
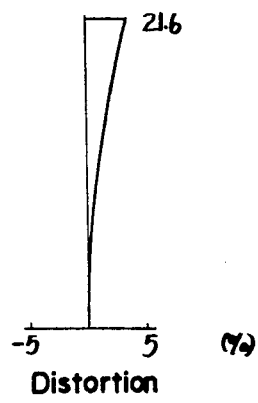
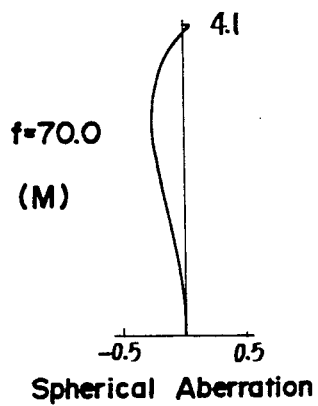
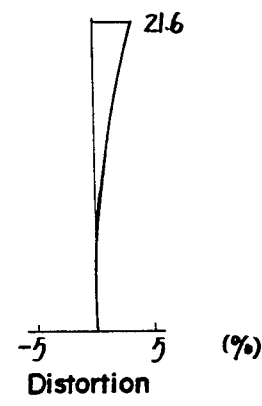
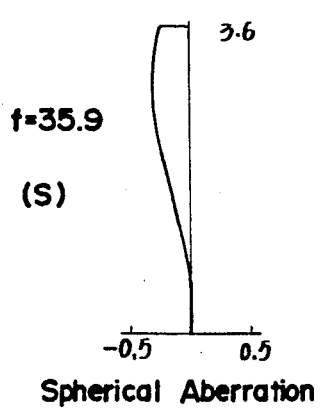
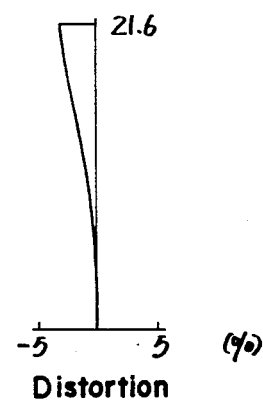

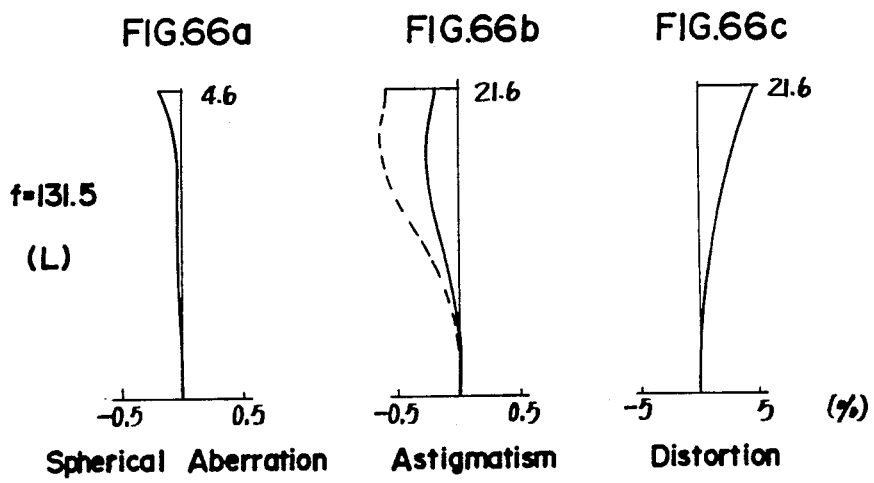
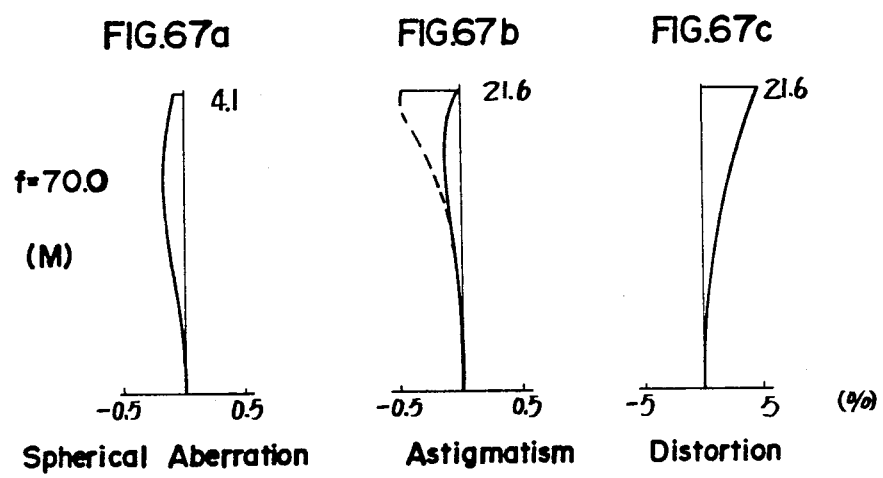
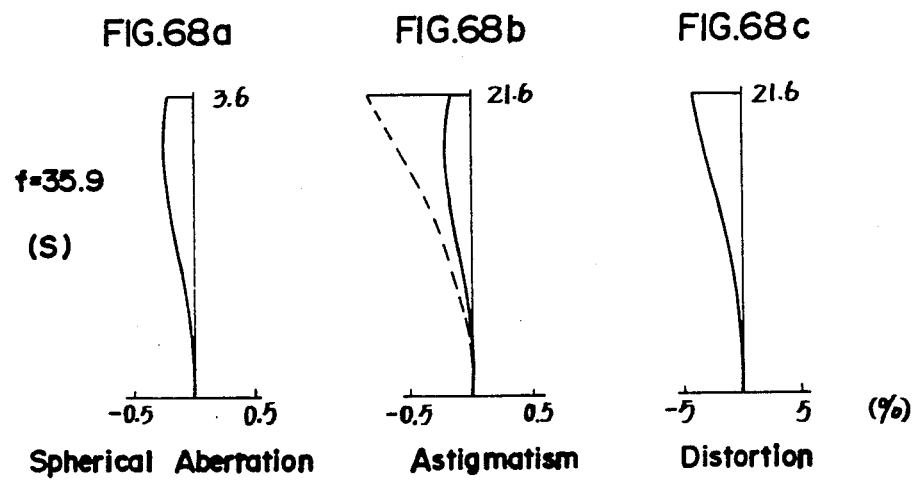

ZOOM LENS SYSTEM OF RELATIVELY HIGH ZOOM RATIO RANGING TO WIDE ANGLE PHOTOGRAPHY

BACKGROUND OF THE INVENTION

1. Field of the Invention

The present invention relates to a zoom lens system of a high zoom ratio greater than 2.3 ranging from a telephoto to wide field angle for use in a still camera, such as 35 mm SLR cameras.

2. Description of the Prior Art

In this field of art, there has been various attempts to provide a zoom lens system of a relatively high zoom ratio ranging to wide field angle. Prior art zoom lens systems attempting to achieve these results can be roughly classified into two types, the first one having a negative front lens group, while the second one having a positive front lens group.

The first type is in its nature favorable to the purpose of providing the wide angle zoom lens system, while it is unfavorable to the reducing the total length thereby providing a compactness to the lens system. A most popular and simplified zoom lens system that can be classified as a first type is a so-called two-group zoom lens system consisting of a negative front lens group and a positive rear lens group. Although such a two-group zoom lens system is suitable for a limited zoom ratio, such as 2, it is difficult to further increase the zoom ratio. In other words, if the zoom ratio in the two-group zoom lens system is attempted to be increased so as to range to a focal length greater than 85 mm in terms of a 35 mm SLR camera, the manufacturing errors of air spaces between the lens elements greatly influence the correction of spherical aberration in the longer focal length range to thereby fail in providing any practical and reliable product.

On the other hand, in the second type of zoom lens system with the front positive lens group, if the zoom range is extended to reach a focal length less than the length of a diagonal line of the effective image plane, the focusing by means of moving the front positive lens group is difficult or the diameter of the front positive lens group is excessively increased. A typical example of a zoom lens system classified into the second type is a so-called four-group zoom lens system consisting of a front focusing lens group, a variator lens group, a compensator lens group and a relay lens group. In such a four-group zoom lens system, if the zoom range is attempted to be extended to a focal length less than 40 mm with the focusing capability by means of the front lens group and the compactness of the whole lens system maintained, the focal lengths of the front lens group and the variator lens group become excessively short to cause various abberrations which are difficult to be sufficiently corrected.

Examples of patented prior art literature can be found in U.S. Pat. No. 4,256,381 and U.S. Pat. No. 4,299,454.

The prior art is still seeking to provide a relatively compact and economical zoom lens system having a relatively wide range of zooming into the wide angle range with adequate optical correction.

SUMMARY OF THE INVENTION

An object of the present invention is to provide a zoom lens system with a relatively high zoom ratio ranging to a wide field angle while maintaining a compact size.

Another object of the present invention is to provide a zoom lens system with aberrations well corrected across the entire zoom range.

Still another object of the present invention is to provide a zoom lens system with an increased tolerance to any manufacturing error.

A further object of the present invention is to provide a zoom lens system with both an increased speed and increased zoom ratio.

A still further object of the present invention is to provide a zoom lens system with a relatively high zoom ratio ranging to a wide field angle capable of focusing by means of moving the front lens group.

A still another further object of the present invention is to provide a zoom lens system with a wide zoom range such as 35–80 mm, 35–100 mm, 35–105 mm, 35–135 mm, 35–150 mm and 35–200 mm with respect to 35 mm SLR cameras.

According to the present invention, a zoom lens system is provided, which comprises a first positive lens group, a second negative lens group of a novel construcion which consists of a first negative subgroup, a second positive subunit located on the image side of the first negative subunit with an unchangeable air space and a third negative subunit located on the image side of the second positive subunit with an unchangeable air space, and a third positive lens group, wherein at least the air space between the first and second lens groups and the air space between the second and third lens groups are changeable upon zooming. Further according to another feature of the present invention, the focusing is possible by means of moving the first lens group with the other lens groups left stationary.

The features of the present invention which are believed to be novel are set forth with particularity in the appended claims. The present invention, both as to its organization and manner or operation, together with further objects and advantages thereof, may best be understood by reference to the following description, taken in conjunction with the accompanying drawings.

BRIEF DESCRIPTION OF THE DRAWINGS

FIGS. 18a, 18b and 18c represent aberration curves of the first embodiment for the longest focal length;

FIGS. 19a, 19b and 19c represent aberration curves of the first embodiment for the medium focal length;

FIGS. 20a, 20b and 20c represent aberration curves of the first embodiment for the shortest focal length;

FIGS. 21a, 21b and 21c represent aberration curves of the second embodiment for the longest focal length;

FIGS. 22a, 22b and 22c represent aberration curves of the second embodiment for the medium focal length;

FIGS. 23a, 23b and 23c represent aberration curves of the second embodiment for the shortest focal length;

FIGS. 24a, 24b and 24c represent aberration curves of the third embodiment for the longest focal length;

FIGS. 25a, 25b and 25c represent aberration curves of the third embodiment for the medium focal length;

FIGS. 26a, 26b and 26c represent aberration curves of the third embodiment for the shortest focal length;

FIGS. 30a, 30b and 30c represent aberration curves of the fifth embodiment for the longest focal length;

FIGS. 31a, 31b and 31c represent aberration curves of the fifth embodiment for the medium focal length;

FIGS. 32a, 32b and 32c represent aberration curves of the fifth embodiment for the shortest focal length;

FIGS. 33a, 33b and 33c represent aberration curves of the sixth embodiment for the longest focal length;

FIGS. 34a, 34b and 34c represent aberration curves of the sixth embodiment for the medium focal length;

FIGS. 35a, 35b and 35c represent aberration curves of the sixth embodiment for the shortest focal length;

FIGS. 36a, 36b and 36c represent aberration curves of the seventh embodiment for the longest focal length;

FIGS. 37a, 37b and 37c represent aberration curves of the seventh embodiment for the medium focal length;

FIGS. 38a, 38b and 38c represent aberration curves of the seventh embodiment for the shortest focal length;

FIGS. 39a, 39b and 39c represent aberration curves of the eighth embodiment for the longest focal length;

FIGS. 40a, 40b and 40c represent aberration curves of the eighth embodiment for the medium focal length;

FIGS. 41a, 41b and 41c represent aberration curves of the eighth embodiment for the shortest focal length;

FIGS. 42a, 42b and 42c represent aberration curves of the ninth embodiment for the longest focal length;

FIGS. 43a, 43b and 43c represent aberration curves of the ninth embodiment for the medium focal length;

FIGS. 44a, 44b and 44c represent aberration curves of the ninth embodiment for the shortest focal length;

FIGS. 45a, 45b and 45c represent aberration curves of the tenth embodiment for the longest focal length;

FIGS. 46a, 46b and 46c represent aberration curves of the tenth embodiment for the medium focal length;

FIGS. 47a, 47b and 47c represent aberration curves of the tenth embodiment for the shortest focal length;

FIGS. 48a, 48b and 48c represent aberration curves of the eleventh embodiment for the longest focal length;

FIGS. 49a, 49b and 49c represent aberration curves of the eleventh embodiment for the medium focal length;

FIGS. 50a, 50b and 50c represent aberration curves of the eleventh embodiment for the shortest focal length;

FIGS. 51a, 51b and 51c represent aberration curves of the twelfth embodiment for the longest focal length;

FIGS. 52a, 52b and 52c represent aberration curves of the twelfth embodiment for the medium focal length;

FIGS. 53a, 53b and 53c represent aberration curves of the twelfth embodiment for the shortest focal length;

FIGS. 54a, 54b and 54c represent aberration curves of the thirteenth embodiment for the longest focal length;

FIGS. 55a, 55b and 55c represent aberration curves of the thirteenth embodiment for the medium focal length;

FIGS. 56a, 56b and 56c represent aberration curves of the thirteenth embodiment for the shortest focal length;

FIGS. 60a, 60b and 60c represent aberration curves of the fifteenth embodiment for the longest focal length;

FIGS. 61a, 61b and 61c represent aberration curves of the fifteenth embodiment for the medium focal length;

FIGS. 62a, 62b and 62c represent aberration curves of the fifteenth embodiment for the shortest focal length;

FIGS. 63a, 63b and 63c represent aberration curves of the sixteenth embodiment for the longest focal length;

FIGS. 64a, 64b and 64c represent aberration curves of the sixteenth embodiment for the medium focal length;

FIGS. 65a, 65b and 65c represent aberration curves of the sixteenth embodiment for the shortest focal length;

FIGS. 66a, 66b and 66c represent aberration curves of the seventeenth embodiment for the longest focal length;

FIGS. 67a, 67b and 67c represent aberration curves of the seventeenth embodiment for the medium focal length; and FIGS. 68a, 68b and 68c represent aberration curves of the seventeenth embodiment for the shortest focal length.

DETAILED DESCRIPTION OF THE PREFERRED EMBODIMENTS

Figure 1:
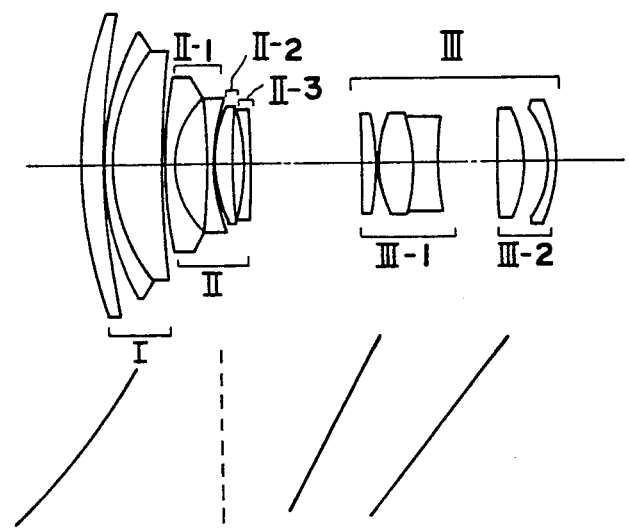
FIG. 1 represents a cross sectional view of a first embodiment of the present invention.

The following description is provided to enable any person skilled in the optical and camera field to make and use the invention and sets forth the best modes contemplated by the inventors for carrying out their invention. Various modifications, however, will remain readily apparent to those skilled in the art, since the generic principles of the present invention have been defined herein specifically to provide an improved compact zoom lens system with an increased zoom ratio ranging to a wide field angle. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with a 35 mm SLR camera.

In the drawings, schematic cross sectional views disclose the position of the lens group and lens elements for the respective shortest focal length (S). Due to the number of lens elements involved, it was not deemed appropriate to include individual designation of the radius of curvature and axial distances for each lens element and air space. These values, however, are provided in the accompanying Tables set forth herein, and the schematic cross sectional views of the respective embodiments follow the normal conventions of an object at the left-hand side of the drawing and the image plane at the right-hand side.

Figure 2:
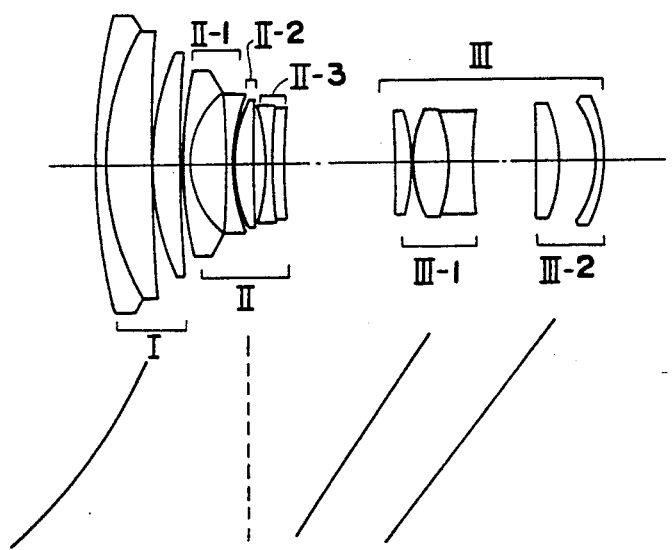
FIG. 2 represents a cross sectional view of a second embodiment of the present invention.
Figure 3:
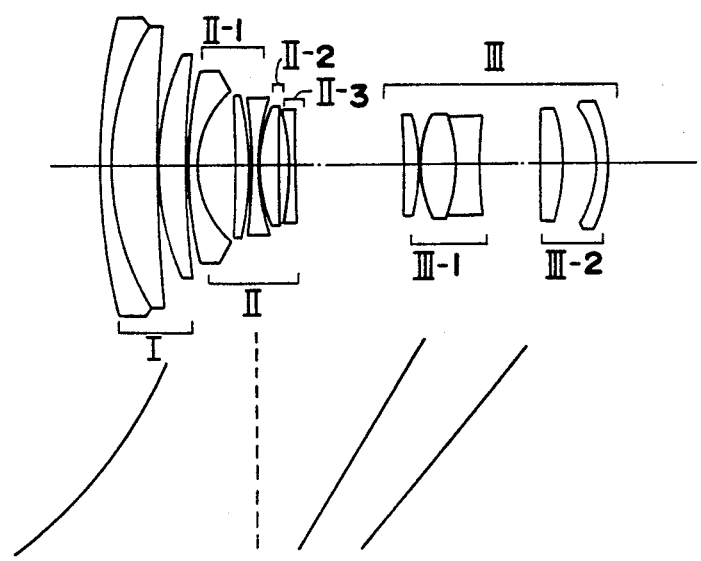
FIG. 3 represents a cross sectional view of a third embodiment of the present invention.
Figure 4:
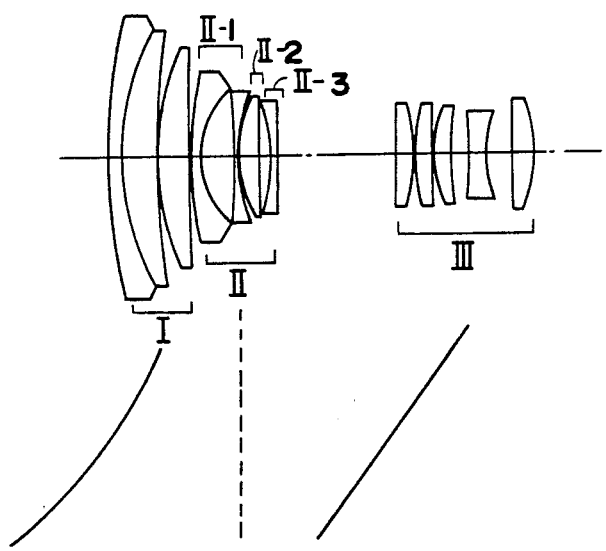
FIG. 4 represents a cross sectional view of a fourth embodiment of the present invention.
Figure 5:
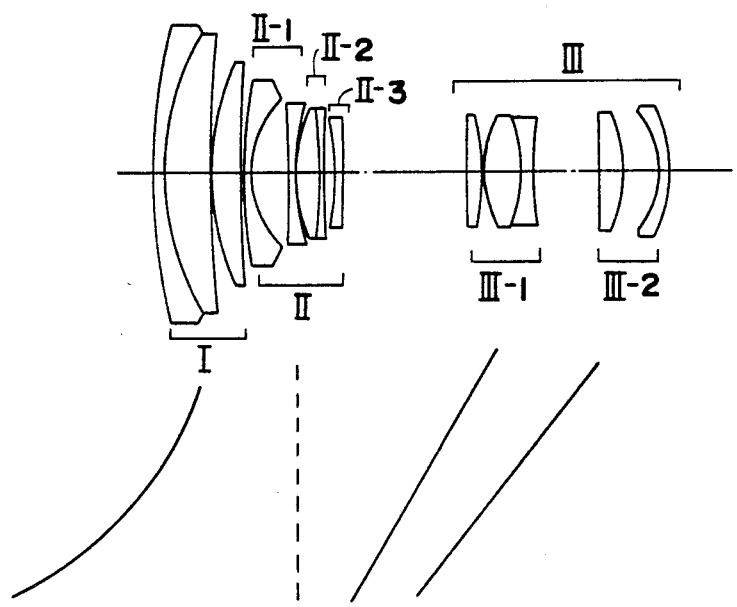
FIG. 5 represents a cross sectional view of a fifth embodiment of the present invention.
Figure 6:
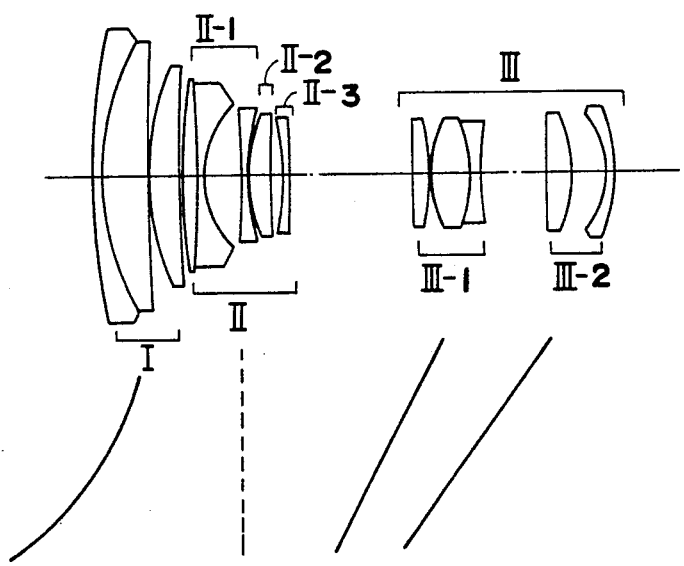
FIG. 6 represents a cross sectional view of a sixth embodiment of the present invention.
Figure 7:
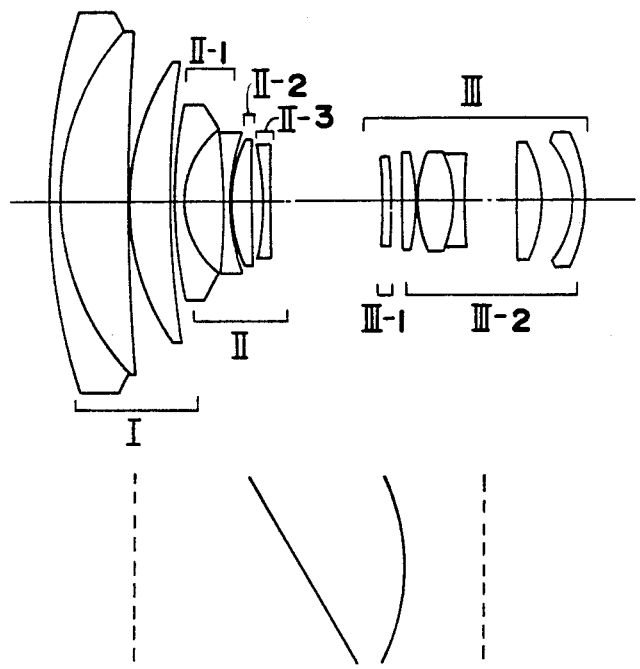
FIG. 7 represents a cross sectional view of a seventh embodiment of the present invention.
Figure 8:
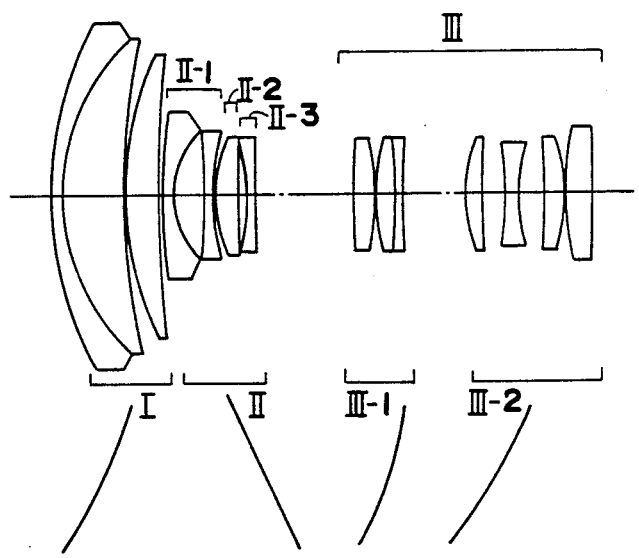
FIG. 8 represents a cross sectional view of a eighth embodiment of the present invention.
Figure 9:
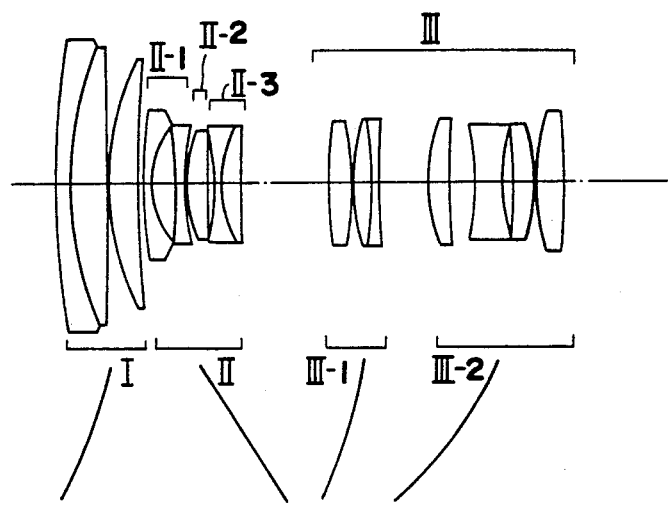
FIG. 9 represents a cross sectional view of a ninth embodiment of the present invention.
Figure 10:
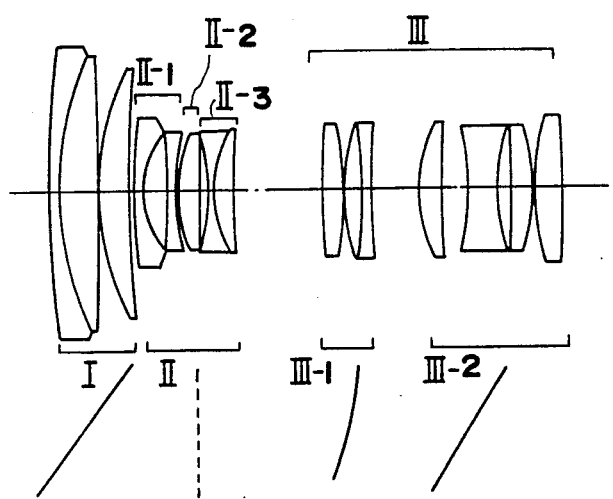
FIG. 10 represents a cross sectional view of a tenth embodiment of the present invention.
Figure 11:
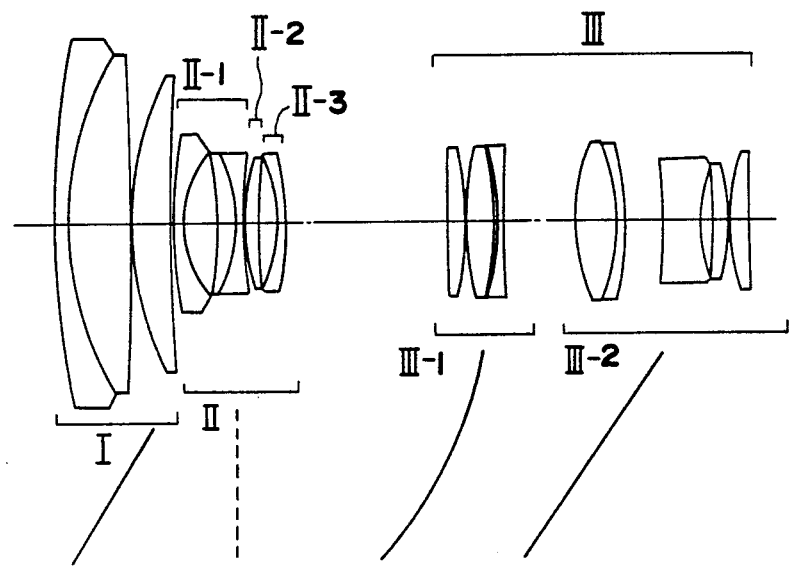
FIG. 11 represents a cross sectional view of a eleventh embodiment of the present invention.
Figure 12:
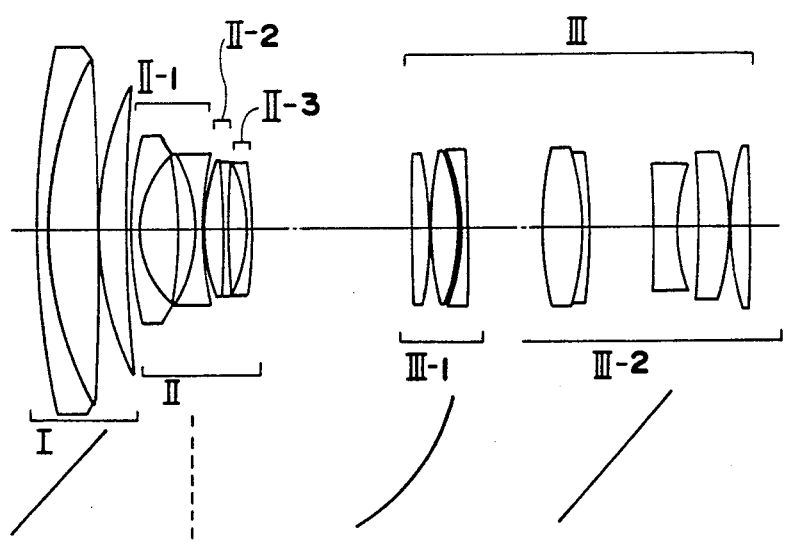
FIG. 12 represents a cross sectional view of a twelfth embodiment of the present invention.
Figure 13:
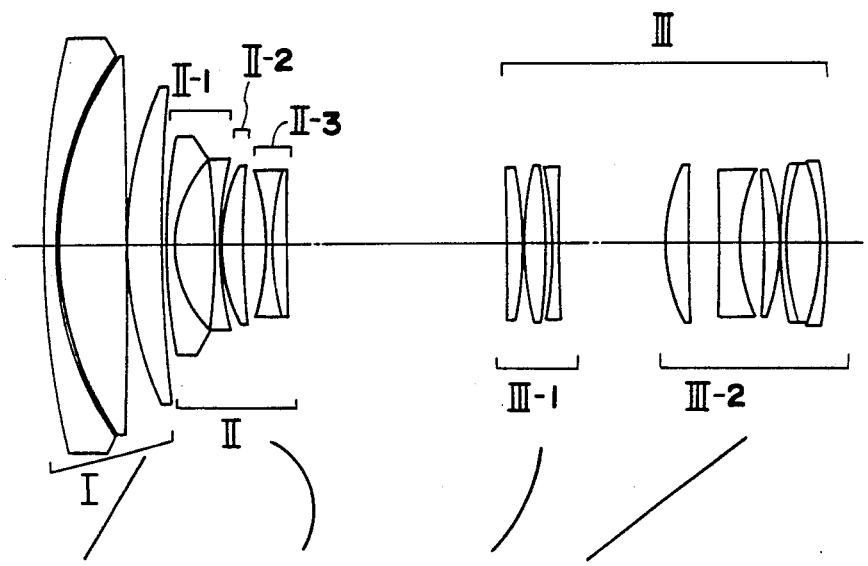
FIG. 13 represents a cross sectional view of a thirteenth embodiment of the present invention.
Figure 14:
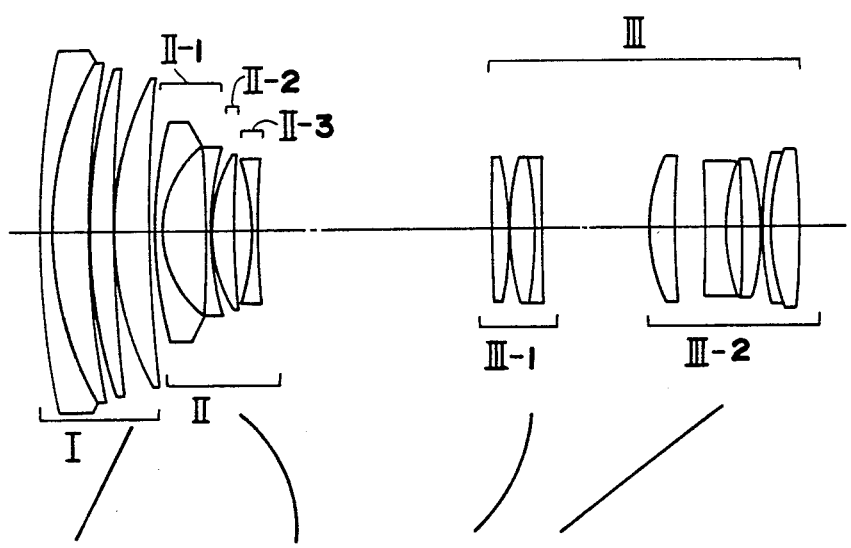
FIG. 14 represents a cross sectional view of a fourteenth embodiment of the present invention.
Figure 15:
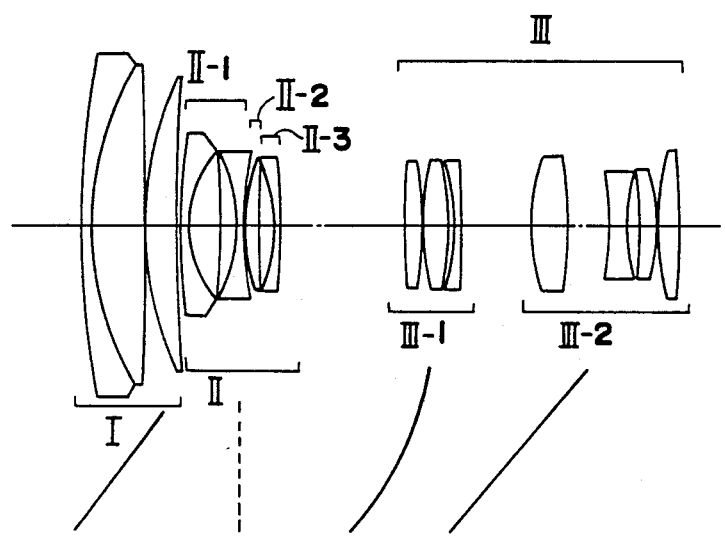
FIG. 15 represents a cross sectional view of a fifteenth embodiment of the present invention.
Figure 16:
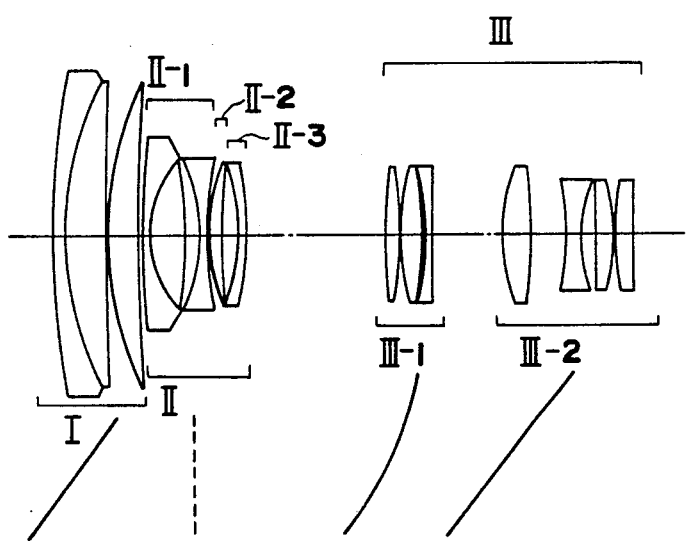
FIG. 16 represents a cross sectional view of a sixteenth embodiment of the present invention.
Figure 17:
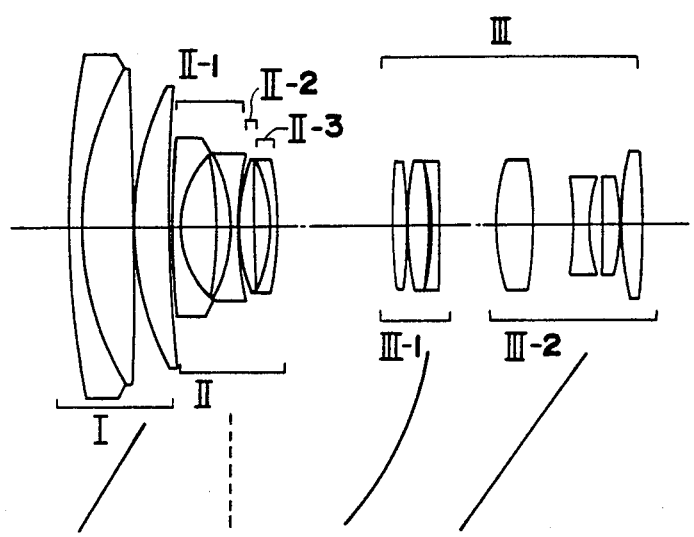
FIG. 17 represents a cross sectional view of a seventeenth embodiment of the present invention.
Figure 27A:
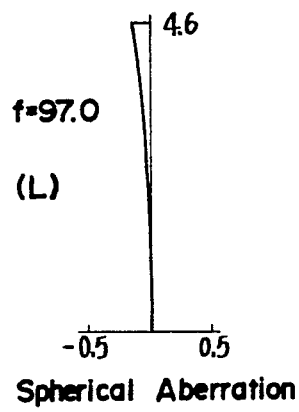
FIGS. 27a, 27b and 27c represent aberration curves of the fourth embodiment for the longest focal length.
Figure 27B:
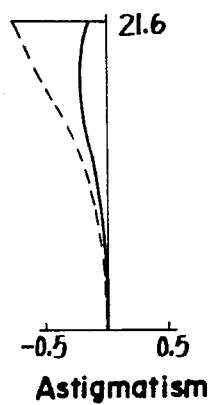
Figure 27C:
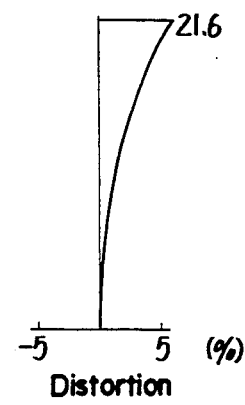
Figure 28A:
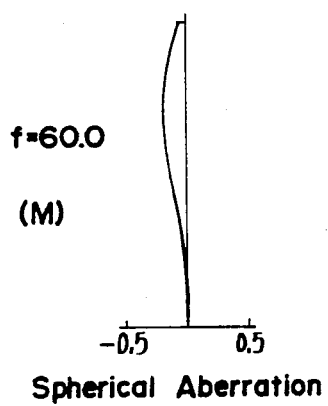
FIGS. 28a, 28b and 28c represent aberration curves of the fourth embodiment for the medium focal length.
Figure 28B:
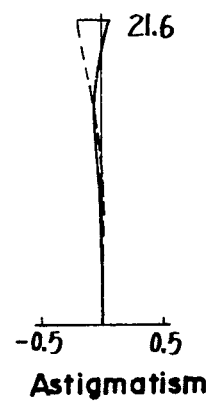
Figure 28C:
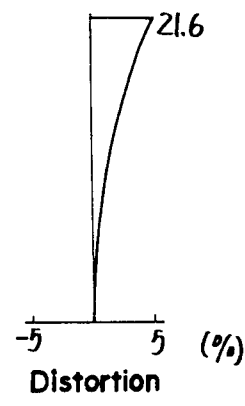
Figure 29A:
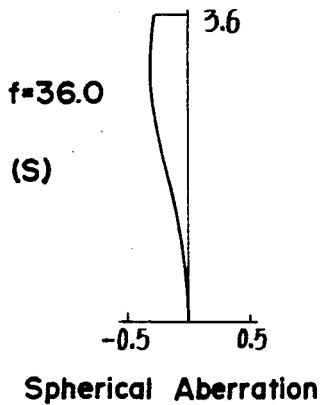
FIGS. 29a, 29b and 29c represent aberration curves of the fourth embodiment for the shortest focal length.
Figure 29B:
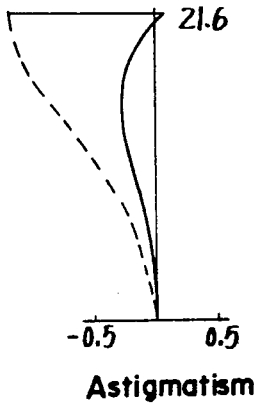
Figure 29C:
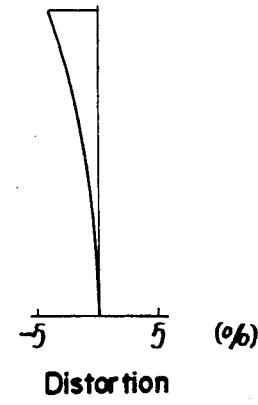
Figure 57A:
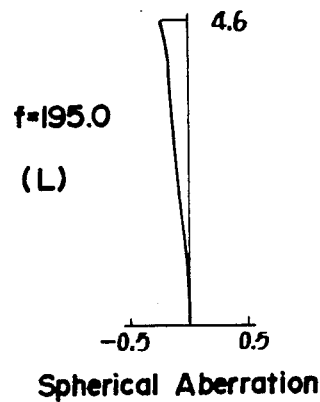
FIGS. 57a, 57b and 57c represent aberration curves of the fourteenth embodiment for the longest focal length.
Figure 57B:
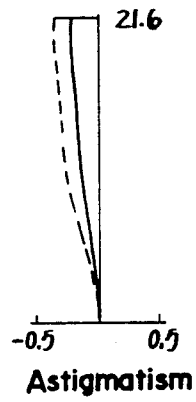
Figure 57C:
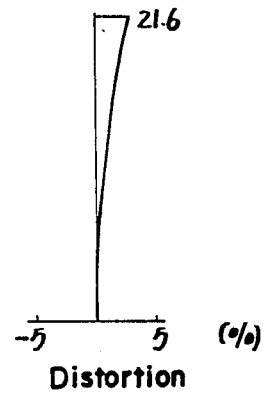
Figure 58A:
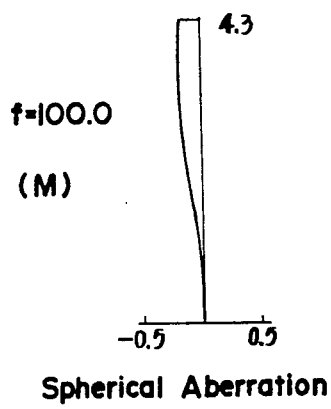
FIGS. 58a, 58b and 58c represent aberration curves of the fourteenth embodiment for the medium focal length.
Figure 58B:
Figure 58C:
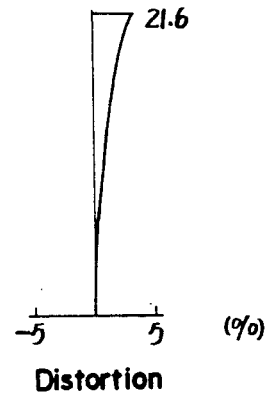
Figure 59A:
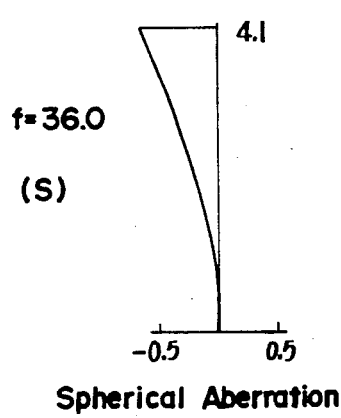
FIGS. 59a, 59b and 59c represent aberration curves of the fourteenth embodiment for the shortest focal length.
Figure 59B:
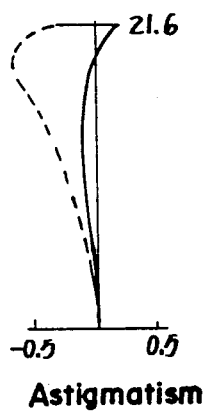
Figure 59C:
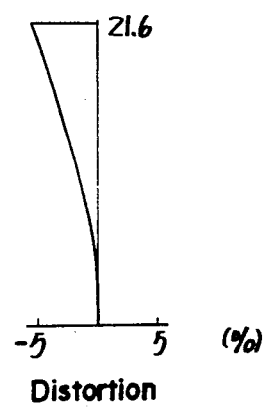

As disclosed in FIGS. 1 to 17, the present invention provides a zoom lens system of a relatively high zoom ratio ranging to wide angle photography in which the shortest focal length is less than the length of diagonal line of the effective image plane comprising from the object to the image side: a first lens group (I) of a positive refractive power; a second lens group (II) of a negative refractive power consisting of a first negative or subunit (II-1), a second positive subunit (II-2) located on the image side of the first negative subgroup (II-1) with an unchangeable air space and a third negative subunit (II-3) located on the image side of the second positive subgroup (II-2) with an unchangeable air space; and a third lens group (III) of a positive refractive power, wherein at least the air space between the first and second lens groups and the air space between the second and third lens groups are changeable upon zooming. The term "subunit" refers to one or more lens elements while the term "group" refers to a plurality of lens elements. As is apparent from the embodiments, the first negative subunit (II-1) includes at least two separate negative lenses, the absolute value of the radius of curvature being less on the image side surface than on the object side surface with respect to the object side one of the two separate negative lenses in the first negative subunit (II-1). The second positive subunit (II-2) includes at least one positive lens with an object side surface of a lesser absolute value of radius of curvature and an image side surface of a greater absolute value of radius of curvature. And, the third negative subunit (II-3) includes at least one negative lens with an object side surface of a lesser absolute value of radius of curvature and an image side surface of a greater absolute value of radius of curvature. Further, the first lens group (I) can be moved for focusing with the other lens groups left stationary.

According to another feature of the present invention the lens system fulfills the following condition:

$$R_a > R_b \qquad (1)$$

wherein:

$R_a$ represents the radius of curvature of the most image side surface of the first negative subunit (II-1); and $R_b$ represents the radius of curvature of the most object side surface of the second positive subunit (II-2).

One of the most important features of the present invention resides in the novel shape of the second negative lens group (II). The first point of the novel shape of the second negative lens group (II) is the use of the third negative subunit (II-3) located at the image side end of the second lens group (II). In the prior art classified into the type with a positive front lens group, a typical shape of the conventional second negative lens group consists of a first negative subunit and a second negative subunit, at least one of which may be a doublet for the purpose of correcting the chromatic aberration if necessary. Another conventional second negative lens group consists of a first negative subunit, a second negative subunit and a third positive subunit for the purpose of balancing the spherical aberration by means of the combination of the second and third subunits if an intolerable variation in the spherical aberration will be caused by zooming. These conventional shapes are, however, only practical in the case of a relatively weak refractive power of the second negative lens group which is suitable for a telephoto zoom lens system. On the other hand, according to the present invention, the third negative subunit (II-3) is used in combination with the first negative subunits (II-1) and the second positive subunits (II-2) to strengthen the negative refractive power of the second negative lens group (II) and to shorten the image side focal length of the second negative lens group (II), which is effective for reducing the thin lens air space between the second and third lens groups to achieve a compact size for the whole lens system.

The second point of the feature relating to the shape of the second negative lens group (II) is the shapes of the most image side surface ($R_a$) of the first negative subunit (II-1) and the most object side surface ($R_b$) of the second positive subunit (II-2). In order words, the above condition (1) defines the shape of these surfaces for reducing the variation in spherical aberration upon zooming although the second negative lens group (II) of the present invention has a greater negative refractive power than the conventional one. The most object side surface ($R_b$) of the second positive subunit (II-2) fulfilling condition (1) is effective to cause a negative deviation of the spherical aberration to moderate the positive deviation of the spherical aberration inherent to the whole second negative lens group (II), which reduces the variation in spherical aberration.

With respect to the shape of the second negative lens group (II), the present invention further provides the following conditions:

$$\Phi < 0 \qquad (2)$$

$$0.2 < |f_{II}|/f_{II-2} < 0.8 \qquad (3)$$

$$0.5 < f_{II-1}/f_{II} < 1.2 \qquad (4)$$

wherein:

$\Phi$ represents the refractive power of the air lens formed between the second positive subunit (II-2) and the third negative subunit (II-3);

$f_{II}$ represents the focal length of the second lens group (II);

$f_{II-1}$ represents the focal length of the first negative subunit (II-1); and $f_{II-2}$ represents the focal length of the second positive subunit (II-2).

Condition (2) relates to condition (1) and the correction of the spherical aberration. As has been stated, the shapes of the pair of surfaces forming the unchangeable air lens between the first and second subunits defined by condition (1) causes the negative diviation of the spherical aberration. However, if the negative deviation of the spherical aberration is sufficiently caused to correct the lower degree of spherical aberration, the higher degree of spherical aberration will be rather excessively corrected. The air unchangeable lens between the second and third subunits fulfilling condition (2) is effective to cancel such an excessive correction of the higher degree of spherical aberration.

Condition (3) relatively defines the refractive power of the second positive subunit (II-2) for correcting the spherical aberration of the second lens group (II) having a greater negative refractive power than in the conventional one. If the lower limit is violated, an excessive negative deviation of spherical aberration would be caused in the whole second negative lens group (II). On the other hand, if the upper limit is violated, the negative refractive powers of the first subunit (II-1) and the third subunit (II-3) would have to be excessively strong to fail in correcting coma, especially at the balance between the shortest and medium focal lengths of the whole lens system.

Condition (4) is more preferably as follows:

$$0.7 < f_{II\text{-}1}/f_{II} < 1.2, \quad (4)'$$

and defines the refractive power of the first negative subunit (II-1). Any violation of the lower limit would cause an excessive negative refractive power of the first subunit (II-1), which should be cancelled by an excessive positive refractive power of the second positive subunit (II-2). Such excessive refractive powers would fail in achieving any practical speed of the lens system and make the adoption of the third negative subunit (II-3) meaningless. On the other hand, if the upper limit is violated, the third negative subunit (II-3) would have to be burdened with an excessive negative refractive power to fail in sufficiently correcting the distortion at the shortest focal length, and the above mentioned second point of the feature of the second lens group (II) relating to condition (1) would no longer be effective.

With respect to the feature of the focusing by means of moving the first lens group (I), the present invention provides the following condition:

$$0.4 < f_w/f_I < 0.6 \quad (5)$$

wherein:

$f_w$ represents the shortest focal length of the whole lens system; and $f_I$ represents the focal length of the first lens group.

Condition (5) defines the refractive power of the first lens group (I). If the upper limit is violated, the distortion would be increased especially at the longest focal length of the whole lens system. On the other hand, if the lower limit is violated, the closest object distance practically attained by means of moving the first lens group (I) with the other lens groups left stationary would be unsatisfactory.

Further, according to the present invention, the following conditions are provided:

$$0.6 < |f_{I\,II}|/f_w < 1.2 \quad (6)$$

$$0.4 < f_{III}/f_I < 0.7 \quad (7)$$

$$|f_{II}| < f_{III} < f_I \quad (8)$$

wherein:

$f_{I\,II}$ represents the total focal length of the first and second lens groups at the shortest focal length; and $f_{III}$ represents the focal length of the third lens group (III).

Condition (6) is for extending the shortest focal length into the wide field angle range and for realizing a necessary change in the air space between the first and second lens groups. If the lower limit is violated, the movement of the first lens group (I) is impractically increased if it is moved upon zooming. On the other hand, the violation of the upper limit is unfavorable to a zoom lens system including a wide field angle range. In the case of a telephoto zoom lens system, the value for $|f_{I\,II}|/f_w$ is over the upper limit, and it is difficult to extend the zoom range into the wide field angle since the diameter of the lens group would be extremely increased or the illumination at the marginal area would become insufficient.

Condition (7) defines a practical range for the refractive power of the third lens group (III). If the lower limit is violated, the refractive powers of the second and third lens groups are both excessive as long as condition (5) is fulfilled, which results in a difficulty of correcting aberrations. While, the desired compactness would be no more attained if the upper limit is violated.

Condition (8) further defines a practical refractive power of the third lens group (III). If the lower limit is violated, the desired zoom type of the present invention would be impossible. And, the violation of the upper limit means a case of an insufficiency of the shortest focal length of the whole lens system deviating from the object of the present invention or a case of an extremely short focal length of the first lens group (I) resulting in a difficulty of any practical aberration correction.

In the above conditions, condition (6) can be reduced as follows if some specific demands exist:

$$0.6 < |f_{I\,II}|/f_w < 1.0 \quad (6)'$$

In the reduced range of condition (6)', the second lens group can be left stationary upon zooming to simplify the control of the lens group movement. Further, in the reduced range of condition (6)', a focusing by means of moving the second lens group (II) toward the object side within the whole zoom range is possible. In this case of focusing by means of the second lens group, an air space should be secured between the first and second lens groups at the shortest focal length of the whole lens system for allowing the movement of the second lens group toward the object side upon focusing. Although, such a focusing by means of moving a lens group other than the first lens group shows a difference in the movement for focusing a same object distance depending upon the focal length of the whole lens system, there will be no problem if the lens movement is to be controlled by an electric means such as in an automatic focus control camera.

In a practical design of a zoom lens system according to the present invention, the third lens group (III) is further divided into a first subunit (III-1) and a second subunit (III-2), the air space between the first and second subunits in the third lens group (III) being further changeable upon zooming. Such a division should be made so that the rays in the paraxial light pencil transmitted between the first subunit (III-1) and the second subunit (III-2) are substantially paralel with the optical axis. The change in such an air space in the third lens group (III) upon zooming is effective to correct the variation in astigmatism during zooming.

Further, in a practical design, it is recommended to adopt at least one doublet as a lens in the second lens group (II) for correcting the variation in chromatic aberration, especially the lateral chromatic aberration which would be caused by the relatively great refractive power of the second lens group (II).

The following Tables 1 to 17 disclose, respectively, the first through seventeenth embodiments of the present invention. In the Tables, f equals the focal length, r is the radius of curvature with respective sub numbers indicating the surfaces from the object to image side along the optical axis, d represents the axial distance and includes both the air spaces and the actual thickness of the lens components along the optical axis, N equals the refractive index and again, the sub numbers refer to the particular optical element from the object to image side, and finally, $\nu$ equals the Abbe number and the sub numbers refer to the specific lens elements from the object to image side. The variable air space distances, in the Tables are provided with three separate values that disclose the relative displacement between each of the respective focal lengths.

TABLE 1

[Embodiment 1]

$f = 36.0 \sim 60.0 \sim 97.0 \quad F_{No.} = 3.6 \sim 4.6$

| | | | Radius of Curvature | Axial Distance | Refractive Index | Abbe Number |
|---|---|---|---|---|---|---|
| I | | $r_1$ | 73.361 | $d_1$ 3.500 | $N_1$ 1.69680 | $\nu_1$ 55.5 |
| | | $r_2$ | 126.727 | $d_2$ 0.100 | | |
| | | $r_3$ | 43.958 | | | |
| | | $r_4$ | 28.169 | $d_3$ 1.200 | $N_2$ 1.84666 | $\nu_2$ 23.9 |
| | | | | $d_4$ 8.500 | $N_3$ 1.69680 | $\nu_3$ 55.5 |
| | | $r_5$ | 182.209 | | | |
| | | | | $d_5$ 0.600~7.989~15.809 | | |
| II | 1 | $r_6$ | 81.163 | $d_6$ 1.300 | $N_4$ 1.67000 | $\nu_4$ 57.1 |
| | | $r_7$ | 14.454 | $d_7$ 5.500 | | |
| | | $r_8$ | −140.019 | $d_8$ 1.000 | $N_5$ 1.67000 | $\nu_5$ 57.1 |
| | | $r_9$ | 29.775 | $d_9$ 0.100 | | |
| | 2 | $r_{10}$ | 21.595 | $d_{10}$ 3.150 | $N_6$ 1.80518 | $\nu_6$ 25.4 |
| | | $r_{11}$ | 154.105 | $d_{11}$ 1.800 | | |
| | 3 | $r_{12}$ | −33.009 | $d_{12}$ 1.000 | $N_7$ 1.67000 | $\nu_7$ 57.1 |
| | | $r_{13}$ | −186.185 | | | |
| | | | | $d_{13}$ 18.500~9.152~1.861 | | |
| III | 1 | $r_{14}$ | −507.640 | $d_{14}$ 2.500 | $N_8$ 1.62135 | $\nu_8$ 61.3 |
| | | $r_{15}$ | −34.024 | $d_{15}$ 0.150 | | |
| | | $r_{16}$ | 17.485 | $d_{16}$ 6.000 | $N_9$ 1.51454 | $\nu_{10}$ 54.7 |
| | | $r_{17}$ | −23.105 | $d_{17}$ 4.000 | $N_{10}$ 1.80741 | $\nu_{10}$ 31.6 |
| | | $r_{18}$ | 57.327 | | | |
| | | | | $d_{18}$ 10.000~8.300~7.100 | | |
| | 2 | $r_{19}$ | 364.870 | $d_{19}$ 4.000 | $N_{11}$ 1.66608 | $\nu_{11}$ 47.9 |
| | | $r_{20}$ | −20.606 | $d_{20}$ 4.000 | | |
| | | $r_{21}$ | −14.158 | $d_{21}$ 1.500 | $N_{12}$ 1.80750 | $\nu_{12}$ 35.5 |
| | | $r_{22}$ | −23.398 | | | |

TABLE 2

[Embodiment 2]

$f = 36.0 \sim 60.0 \sim 97.0 \quad F_{No.} = 3.6 \sim 4.6$

| | | | Radius of Curvature | Axial Distance | Refractive Index | Abbe Number |
|---|---|---|---|---|---|---|
| I | | $r_1$ | 100.000 | $d_1$ 1.700 | $N_1$ 1.80518 | $\nu_1$ 25.4 |
| | | $r_2$ | 41.322 | $d_2$ 7.500 | $N_2$ 1.69680 | $\nu_2$ 55.5 |
| | | $r_3$ | 250.300 | | | |
| | | | | $d_3$ 0.100 | | |
| | | $r_4$ | 43.852 | $d_4$ 4.500 | $N_3$ 1.69680 | $\nu_3$ 55.5 |
| | | $r_5$ | 176.326 | | | |
| | | | | $d_5$ 0.600~9.261~17.393 | | |
| II | 1 | $r_6$ | 67.412 | $d_6$ 1.300 | $N_4$ 1.67000 | $\nu_4$ 57.1 |
| | | $r_7$ | 14.963 | $d_7$ 5.900 | | |
| | | $r_8$ | −231.857 | $d_8$ 1.000 | $N_5$ 1.67000 | $\nu_5$ 57.1 |
| | | $r_9$ | 31.696 | $d_9$ 0.100 | | |
| | 2 | $r_{10}$ | 21.783 | $d_{10}$ 3.300 | $N_6$ 1.80518 | $\nu_6$ 25.4 |
| | | $r_{11}$ | 214.482 | $d_{11}$ 1.923 | | |
| | 3 | $r_{12}$ | −34.066 | $d_{12}$ 1.000 | $N_7$ 1.67000 | $\nu_7$ 57.1 |
| | | $r_{13}$ | 83.105 | $d_{13}$ 0.100 | | |
| | | $r_{14}$ | 60.002 | $d_{14}$ 2.000 | $N_8$ 1.74400 | $\nu_7$ 44.9 |
| | | $r_{15}$ | 93.246 | | | |
| | | | | $d_{15}$ 18.000~9.479~2.401 | | |
| III | 1 | $r_{16}$ | −812.018 | $d_{16}$ 2.500 | $N_9$ 1.62135 | $\nu_9$ 61.3 |
| | | $r_{17}$ | −32.614 | $d_{17}$ 0.150 | | |
| | | $r_{18}$ | 17.818 | $d_{18}$ 6.000 | $N_{10}$ 1.50137 | $\nu_{10}$ 56.4 |
| | | $r_{19}$ | −23.326 | $d_{19}$ 4.000 | $N_{11}$ 1.80741 | $\nu_{11}$ 31.6 |
| | | $r_{20}$ | 63.062 | | | |
| | | | | $d_{20}$ 10.000~8.300~7.100 | | |
| | 2 | $r_{21}$ | 356.557 | $d_{21}$ 4.000 | $N_{12}$ 1.67830 | $\nu_{12}$ 49.0 |
| | | $r_{22}$ | −23.366 | $d_{22}$ 5.800 | | |
| | | $r_{23}$ | −14.626 | $d_{23}$ 1.500 | $N_{13}$ 1.80750 | $\nu_{13}$ 35.5 |
| | | $r_{24}$ | −23.999 | | | |

TABLE 3

[Embodiment 3]

$f = 36.0 \sim 60.0 \sim 97.0 \quad F_{No.} = 3.6 \sim 4.6$

| | | Radius of Curvature | Axial Distance | Refractive Index | Abbe Number |
|---|---|---|---|---|---|
| I | $r_1$ | 100.00 | $d_1$ 1.700 | $N_1$ 1.80518 | $\nu_1$ 25.4 |
| | $r_2$ | 41.322 | $d_2$ 7.500 | $N_2$ 1.69680 | $\nu_2$ 55.5 |
| | $r_3$ | 222.539 | | | |
| | | | $d_3$ 0.100 | | |
| | $r_4$ | 41.621 | $d_4$ 4.700 | $N_3$ 1.69680 | $\nu_3$ 55.5 |
| | $r_5$ | 154.849 | | | |
| | | | $d_5$ 0.600~8.800~16.809 | | |

TABLE 3-continued

[Embodiment 3]
$f = 36.0 \sim 60.0 \sim 97.0$   $F_{No.} = 3.6 \sim 4.6$

| | | Radius of Curvature | Axial Distance | Refractive Index | Abbe Number |
|---|---|---|---|---|---|
| | $r_6$ | 72.743 | $d_6$ 1.300 | $N_4$ 1.67000 | $\nu_4$ 57.1 |
| | $r_7$ | 15.934 | $d_7$ 6.000 | $N_5$ 1.74400 | $\nu_5$ 44.9 |
| 1 | $r_8$ | −171.978 | $d_8$ 2.000 | | |
| II | $r_9$ | −65.535 | $d_9$ 0.500 | | |
| | $r_{10}$ | −74.147 | $d_{10}$ 1.000 | $N_6$ 1.67000 | $\nu_6$ 57.1 |
| | $r_{11}$ | 29.596 | $d_{11}$ 0.100 | | |
| 2 | $r_{12}$ | 22.219 | $d_{12}$ 3.300 | $N_7$ 1.80518 | $\nu_7$ 25.4 |
| | $r_{13}$ | 202.910 | $d_{13}$ 1.742 | | |
| 3 | $r_{14}$ | −34.299 | $d_{14}$ 1.000 | $N_8$ 1.67000 | $\nu_8$ 57.1 |
| | $r_{15}$ | 179.762 | | | |
| | | | $d_{15}$ 17.500∼8.869∼1.804 | | |
| | $r_{16}$ | −812.018 | $d_{16}$ 2.500 | $N_9$ 1.62135 | $\nu_9$ 61.3 |
| 1 | $r_{17}$ | −31.143 | $d_{17}$ 0.150 | | |
| | $r_{18}$ | 17.895 | $d_{18}$ 6.000 | $N_{10}$ 1.50137 | $\nu_{10}$ 56.4 |
| III | $r_{19}$ | −23.486 | $d_{19}$ 4.000 | $N_{11}$ 1.80741 | $\nu_{11}$ 31.6 |
| | $r_{20}$ | 63.062 | $d_{20}$ 10.00∼8.300∼7.100 | | |
| 2 | $r_{21}$ | 334.840 | $d_{21}$ 4.000 | $N_{12}$ 1.67100 | $\nu_{12}$ 51.8 |
| | $r_{22}$ | −23.429 | $d_{22}$ 5.800 | | |
| | $r_{23}$ | −14.642 | $d_{23}$ 1.500 | $N_{13}$ 1.80750 | $\nu_{13}$ 35.5 |
| | $r_{24}$ | −23.898 | | | |

TABLE 4

[Embodiment 4]
$f = 36.0 \sim 60.0 \sim 97.0$   $F_{No.} = 3.6 \sim 4.6$

| | | Radius of Curvature | Axial Distance | Refractive Index | Abbe Number |
|---|---|---|---|---|---|
| | $r_1$ | 100.000 | $d_1$ 1.700 | $N_1$ 1.80518 | $\nu_1$ 25.4 |
| I | $r_2$ | 41.667 | $d_2$ 6.000 | $N_2$ 1.69680 | $\nu_2$ 55.5 |
| | $r_3$ | 161.207 | $d_3$ 0.100 | | |
| | $r_4$ | 46.432 | $d_4$ 5.000 | $N_3$ 1.69680 | $\nu_3$ 55.5 |
| | $r_5$ | 472.657 | | | |
| | | | $d_5$ 0.600∼9.232∼17.282 | | |
| | $r_6$ | 76.494 | $d_6$ 1.300 | $N_4$ 1.67790 | $\nu_4$ 55.4 |
| 1 | $r_7$ | 14.824 | $d_7$ 5.000 | | |
| | $r_8$ | −288.559 | $d_8$ 1.000 | $N_5$ 1.67000 | $\nu_5$ 57.1 |
| | $r_9$ | 30.217 | | | |
| II | $r_{10}$ | 21.171 | $d_9$ 0.100 | | |
| 2 | $r_{11}$ | 581.057 | $d_{10}$ 3.300 | $N_6$ 1.80518 | $\nu_6$ 25.4 |
| | | | $d_{11}$ 1.850 | | |
| 3 | $r_{12}$ | −27.987 | $d_{12}$ 1.000 | $N_7$ 1.67830 | $\nu_7$ 49.0 |
| | $r_{13}$ | −315.766 | | | |
| | | | $d_{13}$ 19.500∼9.841∼1.627 | | |
| | $r_{14}$ | 306.401 | $d_{14}$ 3.000 | $N_8$ 1.51680 | $\nu_8$ 64.1 |
| | $r_{15}$ | −31.017 | $d_{15}$ 0.150 | | |
| | $r_{16}$ | 31.608 | $d_{16}$ 3.000 | $N_9$ 1.51728 | $\nu_9$ 69.4 |
| | $r_{17}$ | 155.965 | $d_{17}$ 0.100 | | |
| | $r_{18}$ | 16.937 | $d_{18}$ 3.000 | $N_{10}$ 1.51728 | $\nu_{10}$ 69.4 |
| III | $r_{19}$ | 41.363 | $d_{19}$ 3.100 | | |
| | $r_{20}$ | −90.315 | $d_{20}$ 3.000 | $N_{11}$ 1.80518 | $\nu_{11}$ 25.4 |
| | $r_{21}$ | 19.765 | $d_{21}$ 4.000 | | |
| | 22 | 149.356 | $d_{22}$ 4.000 | $N_{12}$ 1.60565 | $\nu_{12}$ 37.8 |
| | $r_{23}$ | −25.469 | | | |

TABLE 5

[Embodiment 5]
$f = 36.0 \sim 60.0 \sim 97.0$   $F_{No.} = 3.6 \sim 4.6$

| | | Radius of Curvature | Axial Distance | Refractive Index | Abbe Number |
|---|---|---|---|---|---|
| | $r_1$ | 111.111 | $d_1$ 1.700 | $N_1$ 1.80518 | $\nu_1$ 25.4 |
| | $r_2$ | 43.478 | $d_2$ 7.500 | $N_2$ 1.69680 | $\nu_2$ 55.5 |
| I | $r_3$ | 295.194 | $d_3$ 0.100 | | |
| | $r_4$ | 43.521 | $d_4$ 4.500 | $N_3$ 1.69680 | $\nu_3$ 55.5 |
| | $r_5$ | 182.083 | | | |
| | | | $d_5$ 0.800∼7.086∼15.253 | | |
| | $r_6$ | 92.924 | $d_6$ 1.300 | $N_4$ 1.74400 | $\nu_4$ 44.9 |
| 1 | $r_7$ | 16.759 | $d_7$ 6.000 | | |
| | $r_8$ | −192.374 | | | |
| | $r_9$ | 37.024 | $d_8$ 1.000 | $N_5$ 1.69680 | $\nu_5$ 55.5 |
| II | $r_{10}$ | 24.946 | $d_9$ 0.100 | | |
| 2 | $r_{11}$ | −100.000 | $d_{10}$ 3.800 | $N_6$ 1.80518 | $\nu_6$ 25.4 |
| | $r_{12}$ | 154.409 | $d_{11}$ 1.000 | $N_7$ 1.66755 | $\nu_7$ 42.0 |
| | | | $d_{12}$ 2.000 | | |
| 3 | $r_{13}$ | −34.832 | $d_{13}$ 1.000 | $N_8$ 1.69680 | $\nu_8$ 55.5 |
| | $r_{14}$ | −173.810 | | | |
| | | | $d_{14}$ 20.876∼10.027∼2.000 | | |

TABLE 5-continued

[Embodiment 5]
$f = 36.0 \sim 60.0 \sim 97.0$   $F_{No.} = 3.6 \sim 4.6$

| | | Radius of Curvature | Axial Distance | Refractive Index | Abbe Number |
|---|---|---|---|---|---|
| III | 1 | $r_{15}$ 28818.416 | $d_{15}$ 2.500 | $N_9$ 1.62135 | $\nu_9$ 61.3 |
| | | $r_{16}$ −36.755 | $d_{16}$ 0.100 | | |
| | | $r_{17}$ 17.914 | $d_{17}$ 6.500 | $N_{10}$ 1.52133 | $\nu_{10}$ 51.1 |
| | | $r_{18}$ −23.483 | $d_{18}$ 2.000 | $N_{11}$ 1.80741 | $\nu_{11}$ 31.6 |
| | | $r_{19}$ 57.020 | $d_{19}$ 11.00~9.300~8.200 | | |
| | 2 | $r_{20}$ 906.535 | $d_{20}$ 4.000 | $N_{12}$ 1.67790 | $\nu_{12}$ 55.4 |
| | | $r_{21}$ −23.143 | $d_{21}$ 5.800 | | |
| | | $r_{22}$ −14.444 | $d_{22}$ 1.500 | $N_{13}$ 1.80750 | $\nu_{13}$ 35.5 |
| | | $r_{23}$ −24.692 | | | |

TABLE 6

[Embodiment 6]
$f = 36.0 \sim 60.0 \sim 97.0$   $F_{No.} = 3.6 \sim 4.6$

| | | Radius of Curvature | Axial Distance | Refractive Index | Abbe Number |
|---|---|---|---|---|---|
| I | | $r_1$ 111.111 | $d_1$ 1.700 | $N_1$ 1.80518 | $\nu_1$ 25.4 |
| | | $r_2$ 44.444 | $d_2$ 7.500 | $N_2$ 1.69680 | $\nu_2$ 55.5 |
| | | $r_3$ 302.938 | $d_3$ 0.100 | | |
| | | $r_4$ 43.716 | $d_4$ 4.700 | $N_3$ 1.69680 | $\nu_3$ 55.5 |
| | | $r_5$ 179.572 | $d_5$ 0.800~6.880~14.837 | | |
| II | 1 | $r_6$ 116.172 | $d_6$ 2.500 | $N_4$ 1.80518 | $\nu_4$ 25.4 |
| | | $r_7$ −181.818 | $d_7$ 1.300 | $N_5$ 1.74400 | $\nu_5$ 44.9 |
| | | $r_8$ 16.378 | $d_8$ 6.000 | | |
| | | $r_9$ −210.939 | $d_9$ 1.000 | $N_6$ 1.69680 | $\nu_6$ 55.5 |
| | | $r_{10}$ 38.270 | $d_{10}$ 0.100 | | |
| | 2 | $r_{11}$ 24.705 | $d_{11}$ 3.800 | $N_7$ 1.80518 | $\nu_7$ 25.4 |
| | | $r_{12}$ 168.276 | $d_{12}$ 2.000 | | |
| | 3 | $r_{13}$ −34.000 | $d_{13}$ 1.000 | $N_8$ 1.69680 | $\nu_8$ 55.5 |
| | | $r_{14}$ −140.060 | $d_{14}$ 20.350~9.796~2.000 | | |
| III | 1 | $r_{15}$ 1453.910 | $d_{15}$ 2.500 | $N_9$ 1.62135 | $\nu_9$ 61.3 |
| | | $r_{16}$ −35.438 | $d_{16}$ 0.100 | | |
| | | $r_{17}$ 17.778 | $d_{17}$ 6.500 | $N_{10}$ 1.51602 | $\nu_{10}$ 56.8 |
| | | $r_{18}$ −23.168 | $d_{18}$ 2.000 | $N_{11}$ 1.80741 | $\nu_{11}$ 31.6 |
| | | $r_{19}$ 57.326 | $d_{19}$ 10.761~9.061~7.961 | | |

TABLE 6-continued

[Embodiment 6]
$f = 36.0 \sim 60.0 \sim 97.0$   $F_{No.} = 3.6 \sim 4.6$

| | | Radius of Curvature | Axial Distance | Refractive Index | Abbe Number |
|---|---|---|---|---|---|
| | 2 | $r_{20}$ 2753.303 | $d_{20}$ 4.000 | $N_{12}$ 1.71060 | $\nu_{12}$ 43.3 |
| | | $r_{21}$ −23.278 | $d_{21}$ 5.800 | | |
| | | $r_{22}$ −14.394 | $d_{22}$ 1.500 | $N_{13}$ 1.80750 | $\nu_{13}$ 35.5 |
| | | $r_{23}$ −25.060 | | | |

TABLE 7

[Embodiment 7]
$f = 26.0 \sim 50.0 \sim 82.5$   $F_{No.} = 3.6$

| | | Radius of Curvature | Axial Distance | Refractive Index | Abbe Number |
|---|---|---|---|---|---|
| I | | $r_1$ 100.000 | $d_1$ 1.700 | $N_1$ 1.80518 | $\nu_1$ 25.4 |
| | | $r_2$ 41.667 | $d_2$ 11.000 | $N_2$ 1.69680 | $\nu_2$ 55.5 |
| | | $r_3$ 342.079 | $d_3$ 0.100 | | |
| | | $r_4$ 39.404 | $d_4$ 7.000 | $N_3$ 1.69680 | $\nu_3$ 55.5 |
| | | $r_5$ 154.373 | $d_5$ 0.700 | 8.145 | 17.142 |
| II | 1 | $r_6$ 74.521 | $d_6$ 1.300 | $N_4$ 1.65830 | $\nu_4$ 58.4 |
| | | $r_7$ 14.139 | $d_7$ 6.444 | | |
| | | $r_8$ −165.046 | | | |
| | | $r_9$ 32.188 | $d_8$ 1.200 | $N_5$ 1.66608 | $\nu_5$ 47.9 |
| | 2 | $r_{10}$ 21.488 | $d_9$ 0.100 | | |
| | | | $d_{10}$ 3.500 | $N_6$ 1.80518 | $\nu_6$ 25.4 |
| | | $r_{11}$ 238.282 | $d_{11}$ 2.000 | | |
| | 3 | $r_{12}$ −33.430 | $d_{12}$ 1.200 | $N_7$ 1.65830 | $\nu_7$ 58.5 |
| | | $r_{13}$ 2734.481 | $d_{13}$ 18.000~7.752~1.000 | | |
| III | 1 | $r_{14}$ −69.231 | $d_{14}$ 1.200 | $N_8$ 1.67830 | $\nu_8$ 49.0 |
| | | $r_{15}$ −618.085 | $d_{15}$ 2.000~4.803~2.557 | | |
| | | $r_{16}$ 246.731 | $d_{16}$ 2.500 | $N_9$ 1.61720 | $\nu_9$ 54.0 |
| | | $r_{17}$ −30.782 | $d_{17}$ 0.100 | | |
| | | $r_{18}$ 17.982 | $d_{18}$ 6.000 | $N_{10}$ 1.51602 | $\nu_{10}$ 56.8 |
| | 2 | $r_{19}$ −21.252 | $d_{19}$ 2.000 | $N_{11}$ 1.80750 | $\nu_{11}$ 35.5 |
| | | $r_{20}$ 65.361 | $d_{20}$ 8.500 | | |
| | | $r_{21}$ 220.819 | $d_{21}$ 4.000 | $N_{12}$ 1.67830 | $\nu_{12}$ 49.0 |
| | | $r_{22}$ −22.561 | $d_{22}$ 5.500 | | |
| | | $r_{23}$ −14.300 | $d_{23}$ 2.000 | $N_{13}$ 1.80518 | $\nu_{13}$ 25.4 |
| | | $r_{24}$ −23.891 | | | |

TABLE 8

[Embodiment 8]

$f = 35.9 \sim 60.0 \sim 102.7$   $F_{No.} = 3.6$

| | | Radius of Curvature | Axial Distance | Refractive Index | Abbe Number |
|---|---|---|---|---|---|
| I | | $r_1$ 60.995 | $d_1$ 2.000 | $N_1$ 1.80518 | $\nu_1$ 25.46 |
| | | $r_2$ 36.364 | $d_2$ 9.885 | $N_2$ 1.69100 | $\nu_2$ 54.75 |
| | | $r_3$ 127.846 | | | |
| | | $r_4$ 51.451 | $d_3$ 0.186 | | |
| | | $r_5$ 186.334 | $d_4$ 5.300 | $N_3$ 1.69100 | $\nu_3$ 54.75 |
| | | | $d_5$ 1.000~13.240~23.074 | | |
| II | 1 | $r_6$ 92.332 | $d_6$ 1.500 | $N_4$ 1.75450 | $\nu_4$ 51.57 |
| | | $r_7$ 15.042 | $d_7$ 5.000 | | |
| | | $r_8$ −109.196 | | | |
| | 2 | $r_9$ 37.375 | $d_8$ 1.500 | $N_5$ 1.69680 | $\nu_5$ 55.52 |
| | | $r_{10}$ 24.134 | $d_9$ 0.500 | | |
| | | $r_{11}$ 516.916 | $d_{10}$ 3.500 | $N_6$ 1.80518 | $\nu_6$ 25.43 |
| | 3 | $r_{12}$ −35.786 | $d_{11}$ 1.500 | | |
| | | $r_{13}$ 875.158 | $d_{12}$ 1.500 | $N_7$ 1.69680 | $\nu_7$ 55.52 |
| | | | $d_{13}$ 15.783~8.662~1.000 | | |
| III | 1 | $r_{14}$ 105.116 | $d_{14}$ 3.500 | $N_8$ 1.58913 | $\nu_8$ 61.11 |
| | | $r_{15}$ −62.507 | $d_{15}$ 0.150 | | |
| | | $r_{16}$ 38.142 | $d_{16}$ 3.000 | $N_9$ 1.53241 | $\nu_9$ 51.54 |
| | | $r_{17}$ −100.000 | $d_{17}$ 1.500 | $N_{10}$ 1.80518 | $\nu_{10}$ 25.43 |
| | | $r_{18}$ 269.158 | $d_{18}$ 10.150~4.950~2.650 | | |
| | 2 | $r_{19}$ 24.446 | $d_{19}$ 2.923 | $N_{11}$ 1.60565 | $\nu_{11}$ 37.81 |
| | | $r_{20}$ 104.300 | $d_{20}$ 3.697 | | |
| | | $r_{21}$ −61.484 | | | |
| | | $r_{22}$ 29.010 | $d_{21}$ 2.471 | $N_{12}$ 1.80518 | $\nu_{12}$ 25.43 |
| | | $r_{23}$ −447.079 | $d_{22}$ 4.068 | | |
| | | | $d_{23}$ 3.431 | $N_{13}$ 1.56883 | $\nu_{13}$ 56.04 |
| | | $r_{24}$ −28.052 | $d_{24}$ 0.200 | | |
| | | $r_{25}$ 49.214 | $d_{25}$ 4.558 | $N_{14}$ 1.57616 | $\nu_{14}$ 41.42 |
| | | $r_{26}$ −216.413 | | | |

TABLE 9

[Embodiment 9]

$f = 35.9 \sim 60.0 \sim 102.7$   $F_{No.} = 3.6$

| | | Radius of Curvature | Axial Distance | Refractive Index | Abbe Number |
|---|---|---|---|---|---|
| I | | $r_1$ 166.667 | $d_1$ 2.000 | $N_1$ 1.80518 | $\nu_1$ 25.46 |
| | | $r_2$ 54.054 | $d_2$ 6.200 | $N_2$ 1.69100 | $\nu_2$ 54.75 |
| | | $r_3$ −4219.406 | | | |
| | | $r_4$ 45.669 | $d_3$ 0.186 | | |
| | | $r_5$ 185.307 | $d_4$ 4.800 | $N_3$ 1.69100 | $\nu_3$ 54.75 |
| | | | $d_5$ 1.00~12.505~24.288 | | |
| II | 1 | $r_6$ 87.438 | $d_6$ 1.500 | $N_4$ 1.75450 | $\nu_4$ 51.57 |
| | | $r_7$ 15.312 | $d_7$ 3.600 | | |
| | | $r_8$ −475.561 | | | |
| | | $r_9$ 36.452 | $d_8$ 1.500 | $N_5$ 1.69680 | $\nu_5$ 55.52 |
| | 2 | $r_{10}$ 22.902 | $d_9$ 0.500 | | |
| | | $r_{11}$ 311.710 | $d_{10}$ 3.500 | $N_6$ 1.80518 | $\nu_6$ 25.43 |
| | | | $d_{11}$ 1.300 | | |
| | 3 | $r_{12}$ −34.414 | $d_{12}$ 1.000 | $N_7$ 1.72000 | $\nu_7$ 50.31 |
| | | $r_{13}$ 20.000 | $d_{13}$ 3.000 | $N_8$ 1.80700 | $\nu_8$ 39.75 |
| | | $r_{14}$ 88.423 | $d_{14}$ 15.067~8.064~1.501 | | |
| III | 1 | $r_{15}$ 94.309 | $d_{15}$ 3.500 | $N_9$ 1.58913 | $\nu_9$ 61.11 |
| | | $r_{16}$ −70.626 | $d_{16}$ 0.150 | | |
| | | $r_{17}$ 34.234 | $d_{17}$ 3.000 | $N_{10}$ 1.53241 | $\nu_{10}$ 51.54 |
| | | $r_{18}$ −100.000 | $d_{18}$ 1.500 | $N_{11}$ 1.80518 | $\nu_{11}$ 25.43 |
| | | $r_{19}$ 143.605 | $d_{19}$ 8.155~4.155~1.655 | | |
| | | $r_{20}$ 26.274 | $d_{20}$ 3.484 | $N_{12}$ 1.60565 | $\nu_{12}$ 37.81 |
| | | $r_{21}$ 113.387 | $d_{21}$ 4.239 | | |
| | 2 | $r_{22}$ −56.891 | $d_{22}$ 4.521 | $N_{13}$ 1.80518 | $\nu_{13}$ 25.43 |
| | | $r_{23}$ 30.792 | $d_{23}$ 1.822 | | |
| | | $r_{24}$ −194.584 | $d_{24}$ 3.431 | $N_{14}$ 1.56994 | $\nu_{14}$ 48.06 |
| | | $r_{25}$ −28.877 | $d_{25}$ 0.200 | | |
| | | $r_{26}$ 41.681 | $d_{26}$ 4.670 | $N_{15}$ 1.57616 | $\nu_{15}$ 41.42 |
| | | $r_{27}$ −117.383 | | | |

TABLE 10

[Embodiment 10]

$f = 35.9 \sim 60.0 \sim 102.7$   $F_{No.} = 3.6$

| | Radius of Curvature | Axial Distance | Refractive Index | Abbe Number |
|---|---|---|---|---|
| I | $r_1$ 166.667 | $d_1$ 2.000 | $N_1$ 1.80518 | $\nu_1$ 25.46 |
| | $r_2$ 53.476 | $d_2$ 6.200 | $N_2$ 1.69100 | $\nu_2$ 54.75 |
| | $r_3$ −876.846 | | | |
| | $r_4$ 44.857 | $d_3$ 0.186 | | |
| | $r_5$ 192.500 | $d_4$ 4.800 | $N_3$ 1.69100 | $\nu_3$ 54.75 |
| | | $d_5$ 1.000~11.375~20.716 | | |

TABLE 10-continued

[Embodiment 10]

$f = 35.9 \sim 60.0 \sim 102.7$  $F_{No.} = 3.6$

| | | | Radius of Curvature | Axial Distance | | Refractive Index | | Abbe Number |
|---|---|---|---|---|---|---|---|---|
| | | $r_6$ | 94.404 | | | | | |
| | | | | $d_6$ 1.500 | $N_4$ | 1.75450 | $\nu_4$ | 51.57 |
| | 1 | $r_7$ | 15.312 | | | | | |
| | | | | $d_7$ 3.600 | | | | |
| | | $r_8$ | −403.302 | | | | | |
| | | | | $d_8$ 1.500 | $N_5$ | 1.69680 | $\nu_5$ | 55.52 |
| | | $r_9$ | 37.341 | | | | | |
| II | | | | $d_9$ 0.500 | | | | |
| | 2 | $r_{10}$ | 22.520 | | | | | |
| | | | | $d_{10}$ 3.500 | $N_6$ | 1.80518 | $\nu_6$ | 25.43 |
| | | $r_{11}$ | 245.926 | | | | | |
| | | | | $d_{11}$ 1.600 | | | | |
| | | $r_{12}$ | −33.498 | | | | | |
| | | | | $d_{12}$ 1.000 | $N_7$ | 1.72000 | $\nu_7$ | 50.31 |
| | 3 | $r_{13}$ | 20.000 | | | | | |
| | | | | $d_{13}$ 3.000 | $N_8$ | 1.80700 | $\nu_8$ | 39.75 |
| | | $r_{14}$ | 74.385 | | | | | |
| | | | | $d_{14}$ 14.717~7.985~1.500 | | | | |
| | | $r_{15}$ | 92.618 | | | | | |
| | | | | $d_{15}$ 3.500 | $N_9$ | 1.58913 | $\nu_9$ | 61.11 |
| | | $r_{16}$ | −69.103 | | | | | |
| | | | | $d_{16}$ 0.150 | | | | |
| | 1 | $r_{17}$ | 33.553 | | | | | |
| | | | | $d_{17}$ 3.000 | $N_{10}$ | 1.53241 | $\nu_{10}$ | 51.54 |
| | | $r_{18}$ | −100.000 | | | | | |
| | | | | $d_{18}$ 1.500 | $N_{11}$ | 1.80518 | $\nu_{11}$ | 25.43 |
| | | $r_{19}$ | 148.223 | | | | | |
| | | | | $d_{19}$ 8.181~4.181~1.681 | | | | |
| III | | $r_{20}$ | 25.877 | | | | | |
| | | | | $d_{20}$ 3.556 | $N_{12}$ | 1.60565 | $\nu_{12}$ | 37.81 |
| | | $r_{21}$ | 122.950 | | | | | |
| | | | | $d_{21}$ 4.344 | | | | |
| | | $r_{22}$ | −54.330 | | | | | |
| | | | | $d_{22}$ 4.646 | $N_{13}$ | 1.80518 | $\nu_{13}$ | 25.43 |
| | 2 | $r_{23}$ | 30.242 | | | | | |
| | | | | $d_{23}$ 2.398 | | | | |
| | | $r_{24}$ | −217.424 | | | | | |
| | | | | $d_{24}$ 1.431 | $N_{14}$ | 1.56994 | $\nu_{14}$ | 48.06 |
| | | $r_{25}$ | −29.136 | | | | | |
| | | | | $d_{25}$ 0.200 | | | | |
| | | $r_{26}$ | 42.629 | | | | | |
| | | | | $d_{26}$ 4.670 | $N_{15}$ | 1.57616 | $\nu_{15}$ | 41.42 |
| | | $r_{27}$ | −115.579 | | | | | |

TABLE 11

[Embodiment 11]

$f = 36.0 \sim 85.0 \sim 195.0$  $F_{No.} = 3.6 \sim 4.6$

| | | | Radius of Curvature | Axial Distance | | Refractive Index | | Abbe Number |
|---|---|---|---|---|---|---|---|---|
| | | $r_1$ | 142.857 | | | | | |
| | | | | $d_1$ 2.200 | $N_1$ | 1.80518 | $\nu_1$ | 25.43 |
| | | $r_2$ | 51.813 | | | | | |
| | | | | $d_2$ 10.500 | $N_2$ | 1.51680 | $\nu_2$ | 64.12 |
| I | | $r_3$ | −486.836 | | | | | |
| | | | | $d_3$ 0.150 | | | | |
| | | $r_4$ | 54.368 | | | | | |
| | | | | $d_4$ 6.200 | $N_3$ | 1.77250 | $\nu_3$ | 49.77 |
| | | $r_5$ | 379.701 | | | | | |
| | | | | $d_5$ 0.800~20.127~33.801 | | | | |
| | | $r_6$ | 98.774 | | | | | |
| | | | | $d_6$ 1.300 | $N_4$ | 1.77250 | $\nu_4$ | 49.77 |
| | 1 | $r_7$ | 18.096 | | | | | |
| | | | | $d_7$ 5.650 | | | | |
| | | $r_8$ | −74.406 | | | | | |

TABLE 11-continued

[Embodiment 11]

$f = 36.0 \sim 85.0 \sim 195.0$  $F_{No.} = 3.6 \sim 4.6$

| | | | | | | | | |
|---|---|---|---|---|---|---|---|---|
| | | | | $d_8$ 3.100 | $N_5$ | 1.80518 | $\nu_5$ | 25.43 |
| II | | $r_9$ | −23.753 | | | | | |
| | | | | $d_9$ 1.100 | $N_6$ | 1.77250 | $\nu_6$ | 49.77 |
| | | $r_{10}$ | 58.480 | | | | | |
| | | | | $d_{10}$ 0.100 | | | | |
| | | $r_{11}$ | 32.187 | | | | | |
| | 2 | | | $d_{11}$ 2.700 | $N_7$ | 1.75000 | $\nu_7$ | 25.14 |
| | | $r_{12}$ | 219.200 | | | | | |
| | | | | $d_{12}$ 3.000 | | | | |
| | | $r_{13}$ | −25.098 | | | | | |
| | 3 | | | $d_{13}$ 1.100 | $N_8$ | 1.61800 | $\nu_8$ | 63.45 |
| | | $r_{14}$ | −55.939 | | | | | |
| | | | | $d_{14}$ 26.423~14.177~1.000 | | | | |
| | | $r_{15}$ | 304.152 | | | | | |
| | | | | $d_{15}$ 2.800 | $N_9$ | 1.51680 | $\nu_9$ | 64.12 |
| | | $r_{16}$ | −52.496 | | | | | |
| | | | | $d_{16}$ 0.150 | | | | |
| | | $r_{17}$ | 48.139 | | | | | |
| | | | | $d_{17}$ 4.800 | | | | |
| | 1 | $r_{18}$ | −44.596 | | | | | |
| | | | | $d_{18}$ 0.500 | $N_{10}$ | 1.51680 | $\nu_{10}$ | 64.12 |
| | | $r_{19}$ | −39.182 | | | | | |
| | | | | $d_{19}$ 1.100 | $N_{11}$ | 1.80518 | $\nu_{11}$ | 25.43 |
| | | $r_{20}$ | −758.834 | | | | | |
| | | | | $d_{20}$ 11.300~4.219~3.722 | | | | |
| | | $r_{21}$ | 29.507 | | | | | |
| III | | | | $d_{21}$ 6.995 | $N_{12}$ | 1.60342 | $\nu_{12}$ | 38.01 |
| | | $r_{22}$ | −33.050 | | | | | |
| | | | | $d_{22}$ 1.200 | $N_{13}$ | 1.85000 | $\nu_{13}$ | 40.51 |
| | | $r_{23}$ | −59.499 | | | | | |
| | | | | $d_{23}$ 6.679 | $N_{14}$ | 1.85026 | $\nu_{14}$ | 32.30 |
| | | $r_{24}$ | −73.850 | | | | | |
| | | | | $d_{24}$ 5.584 | | | | |
| | | $r_{25}$ | 24.04 | | | | | |
| | | | | $d_{25}$ 2.346 | | | | |
| | 2 | $r_{26}$ | −189.788 | | | | | |
| | | | | $d_{26}$ 2.500 | $N_{15}$ | 1.51680 | $\nu_{15}$ | 64.12 |
| | | $r_{27}$ | −36.716 | | | | | |
| | | | | $d_{27}$ 0.150 | | | | |
| | | $r_{28}$ | 30.688 | | | | | |
| | | | | $d_{28}$ 3.500 | $N_{16}$ | 1.54072 | $\nu_{16}$ | 47.20 |
| | | $r_{29}$ | 472.927 | | | | | |

TABLE 12

[Embodiment 12]

$f = 36.0 \sim 100.0 \sim 195.0$  $F_{No.} = 3.6 \sim 4.6$

| | | | Radius of Curvature | Axial Distance | | Refractive Index | | Abbe Number |
|---|---|---|---|---|---|---|---|---|
| | | $r_1$ | 139.897 | | | | | |
| | | | | $d_1$ 2.000 | $N_1$ | 1.84666 | $\nu_1$ | 23.88 |
| | | $r_2$ | 59.231 | | | | | |
| | | | | $d_2$ 8.000 | $N_2$ | 1.61800 | $\nu_2$ | 63.45 |
| I | | $r_3$ | −698.391 | | | | | |
| | | | | $d_3$ 0.100 | | | | |
| | | $r_4$ | 53.334 | | | | | |
| | | | | $d_4$ 4.600 | $N_3$ | 1.75450 | $\nu_3$ | 51.57 |
| | | $r_5$ | 192.210 | | | | | |
| | | | | $d_5$ 1.000~24.470~34.847 | | | | |
| | | $r_6$ | 69.484 | | | | | |
| | | | | $d_6$ 1.200 | $N_4$ | 1.77250 | $\nu_4$ | 49.77 |
| | 1 | $r_7$ | 17.324 | | | | | |
| | | | | $d_7$ 6.200 | | | | |
| | | $r_8$ | −71.332 | | | | | |

TABLE 12-continued

[Embodiment 12]
f = 36.0~100.0~195.0   $F_{No.}$ = 3.6~4.6

| | | | | | | | | |
|---|---|---|---|---|---|---|---|---|
| II | | $r_9$ −24.402 | $d_8$ | 3.300 | $N_5$ | 1.75000 | $\nu_5$ | 25.14 |
| | | $r_{10}$ 59.621 | $d_9$ | 1.000 | $N_6$ | 1.75450 | $\nu_6$ | 51.57 |
| | | | $d_{10}$ | 0.100 | | | | |
| | 2 | $r_{11}$ 31.909 | $d_{11}$ | 3.300 | $N_7$ | 1.75000 | $\nu_7$ | 25.14 |
| | | $r_{12}$ −134.008 | $d_{12}$ | 0.800 | $N_8$ | 1.74000 | $\nu_8$ | 28.26 |
| | | $r_{13}$ 152.542 | $d_{13}$ | 3.000 | | | | |
| | 3 | $r_{14}$ −25.100 | $d_{14}$ | 1.000 | $N_9$ | 1.61800 | $\nu_9$ | 63.45 |
| | | $r_{15}$ −62.615 | $d_{15}$ | 25.941~11.902~1.500 | | | | |
| | | $r_{16}$ 220.689 | $d_{16}$ | 3.000 | $N_{10}$ | 1.51823 | $\nu_{10}$ | 58.96 |
| | | $r_{17}$ −51.428 | $d_{17}$ | 0.100 | | | | |
| | 1 | $r_{18}$ 48.815 | $d_{18}$ | 4.600 | $N_{11}$ | 1.51823 | $\nu_{11}$ | 58.96 |
| | | $r_{19}$ −32.041 | $d_{19}$ | 0.400 | | | | |
| | | $r_{20}$ −32.066 | $d_{20}$ | 1.000 | $N_{12}$ | 1.84666 | $\nu_{12}$ | 23.88 |
| | | $r_{21}$ −194.356 | $d_{21}$ | 12.000~2.570~2.595 | | | | |
| III | | $r_{22}$ 52.343 | $d_{22}$ | 7.040 | $N_{13}$ | 1.65446 | $\nu_{13}$ | 33.86 |
| | | $r_{23}$ −42.545 | $d_{23}$ | 1.350 | $N_{14}$ | 1.85000 | $\nu_{14}$ | 40.51 |
| | | $r_{24}$ −87.512 | $d_{24}$ | 10.730 | | | | |
| | 2 | $r_{25}$ −190.415 | $d_{25}$ | 3.841 | $N_{15}$ | 1.83400 | $\nu_{15}$ | 37.05 |
| | | $r_{26}$ 31.510 | $d_{26}$ | 3.553 | | | | |
| | | $r_{27}$ −245.549 | | | | | | |
| | | $r_{28}$ −42.958 | $d_{27}$ | 5.050 | $N_{16}$ | 1.49520 | $\nu_{16}$ | 79.74 |
| | | $r_{29}$ 42.437 | $d_{28}$ | 0.100 | | | | |
| | | $r_{30}$ −359.602 | $d_{29}$ | 3.400 | $N_{17}$ | 1.49520 | $\nu_{17}$ | 79.74 |

TABLE 13

[Embodiment 13]
f = 36.0~100.0~195.0   $F_{No.}$ = 3.6~4.6

| | | | | | | | | |
|---|---|---|---|---|---|---|---|---|
| I | | $r_1$ 145.226 | $d_1$ | 2.000 | $N_1$ | 1.84666 | $\nu_1$ | 23.88 |
| | | $r_2$ 53.379 | $d_2$ | 0.500 | | | | |
| | | $r_3$ 53.273 | $d_3$ | 11.000 | $N_2$ | 1.69100 | $\nu_2$ | 54.75 |
| | | $r_4$ −1485.309 | $d_4$ | 0.100 | | | | |
| | | $r_5$ 63.508 | $d_5$ | 5.700 | $N_3$ | 1.80100 | $\nu_3$ | 46.54 |
| | | $r_6$ 252.056 | $d_6$ | 0.827~23.560~31.665 | | | | |
| | 1 | $r_7$ 106.967 | $d_7$ | 1.200 | $N_4$ | 1.75450 | $\nu_4$ | 51.57 |
| | | $r_8$ 20.059 | $d_8$ | 6.600 | | | | |
| | | $r_9$ −120.952 | $d_9$ | 0.800 | $N_5$ | 1.61800 | $\nu_5$ | 63.45 |
| | | $r_{10}$ 65.839 | | | | | | |

TABLE 13-continued

[Embodiment 13]
f = 36.0~100.0~195.0   $F_{No.}$ = 3.6~4.6

| | | | | | | | | |
|---|---|---|---|---|---|---|---|---|
| II | 2 | $r_{11}$ 30.303 | $d_{10}$ | 0.150 | | | | |
| | | $r_{12}$ 95.566 | $d_{11}$ | 3.391 | $N_6$ | 1.84666 | $\nu_6$ | 23.88 |
| | | | $d_{12}$ | 4.075 | | | | |
| | 3 | $r_{13}$ −36.325 | $d_{13}$ | 0.800 | $N_7$ | 1.69100 | $\nu_7$ | 54.75 |
| | | $r_{14}$ 48.780 | $d_{14}$ | 2.500 | $N_8$ | 1.75000 | $\nu_8$ | 25.14 |
| | | $r_{15}$ 486.779 | | | | | | |
| | | | $d_{15}$ | 35.955~16.185~2.000 | | | | |
| | | $r_{16}$ 330.832 | $d_{16}$ | 2.900 | $N_9$ | 1.51680 | $\nu_9$ | 64.12 |
| | | $r_{17}$ −52.585 | $d_{17}$ | 0.100 | | | | |
| | 1 | $r_{18}$ 49.472 | $d_{18}$ | 3.787 | $N_{10}$ | 1.53241 | $\nu_{10}$ | 51.54 |
| | | $r_{19}$ −71.892 | $d_{19}$ | 1.000 | | | | |
| | | $r_{20}$ −55.226 | $d_{20}$ | 1.000 | $N_{11}$ | 1.80518 | $\nu_{11}$ | 25.43 |
| | | $r_{21}$ 789.764 | | | | | | |
| | | | $d_{21}$ | 17.500~3.500~1.000 | | | | |
| III | | $r_{22}$ 30.050 | $d_{22}$ | 3.500 | $N_{12}$ | 1.58267 | $\nu_{12}$ | 46.43 |
| | | $r_{23}$ 250.393 | $d_{23}$ | 5.035 | | | | |
| | | $r_{24}$ −630.529 | $d_{24}$ | 3.500 | $N_{13}$ | 1.80100 | $\nu_{13}$ | 46.54 |
| | 2 | $r_{25}$ 30.609 | $d_{25}$ | 3.694 | | | | |
| | | $r_{26}$ −129.507 | $d_{26}$ | 2.400 | $N_{14}$ | 1.51823 | $\nu_{14}$ | 58.96 |
| | | $r_{27}$ −40.228 | $d_{27}$ | 0.100 | | | | |
| | | $r_{28}$ 52.910 | | | | | | |
| | | $r_{29}$ 39.961 | $d_{28}$ | 1.000 | $N_{15}$ | 1.85000 | $\nu_{15}$ | 40.51 |
| | | $r_{30}$ −38.158 | $d_{29}$ | 5.700 | $N_{16}$ | 1.49520 | $\nu_{16}$ | 79.74 |
| | | $r_{31}$ −84.115 | $d_{30}$ | 1.000 | $N_{17}$ | 1.58144 | $\nu_{17}$ | 40.83 |

TABLE 14

[Embodiment 14]
f = 36.0~100.0~195.0   $F_{No.}$ = 4.1~4.6

| | | | | | | | | |
|---|---|---|---|---|---|---|---|---|
| I | | $r_1$ 144.735 | $d_1$ | 2.000 | $N_1$ | 1.80518 | $\nu_1$ | 25.43 |
| | | $r_2$ 55.241 | $d_2$ | 6.000 | $N_2$ | 1.65844 | $\nu_2$ | 50.88 |
| | | $r_3$ 147.186 | $d_3$ | 0.100 | | | | |
| | | $r_4$ 88.687 | | | | | | |
| | | $r_5$ 227.434 | $d_4$ | 4.000 | $N_3$ | 1.69680 | $\nu_3$ | 55.43 |
| | | | $d_5$ | 0.100 | | | | |
| | | $r_6$ 55.486 | $d_6$ | 5.600 | $N_4$ | 1.69680 | $\nu_4$ | 55.43 |
| | | $r_7$ 248.359 | | | | | | |
| | | | $d_7$ | 1.000~23.399~30.691 | | | | |
| | 1 | $r_8$ 74.396 | $d_8$ | 1.200 | $N_5$ | 1.75450 | $\nu_5$ | 51.57 |
| | | $r_9$ 18.273 | $d_9$ | 7.000 | | | | |

TABLE 14-continued

[Embodiment 14]   $f = 36.0 \sim 100.0 \sim 195.0$   $F_{No.} = 4.1 \sim 4.6$

| Group | | r | | d | | N | | ν | |
|---|---|---|---|---|---|---|---|---|---|
| II | | $r_{10}$ −255.545 | | $d_{10}$ 0.800 | | $N_6$ 1.62135 | | $ν_6$ 61.28 | |
| | | $r_{11}$ 54.582 | | $d_{11}$ 0.150 | | | | | |
| | 2 | $r_{12}$ 25.925 | | $d_{12}$ 3.391 | | $N_7$ 1.80518 | | $ν_7$ 25.43 | |
| | | $r_{13}$ 105.604 | | $d_{13}$ 3.200 | | | | | |
| | 3 | $r_{14}$ −38.771 | | $d_{14}$ 0.800 | | $N_8$ 1.69680 | | $ν_8$ 56.47 | |
| | | $r_{15}$ 131.420 | | | | | | | |
| | | | | $d_{15}$ 38.844~16.991~1.500 | | | | | |
| | 1 | $r_{16}$ 398.065 | | $d_{16}$ 3.000 | | $N_9$ 1.51680 | | $ν_9$ 64.12 | |
| | | $r_{17}$ −46.966 | | $d_{17}$ 0.150 | | | | | |
| | | $r_{18}$ 47.832 | | | | | | | |
| | | $r_{19}$ −66.685 | | $d_{18}$ 4.000 | | $N_{10}$ 1.53241 | | $ν_{10}$ 51.54 | |
| | | $r_{20}$ 607.888 | | $d_{19}$ 1.200 | | $N_{11}$ 1.80518 | | $ν_{11}$ 25.43 | |
| | | | | $d_{20}$ 17.500~3.500~1.000 | | | | | |
| III | | $r_{21}$ 27.210 | | $d_{21}$ 4.000 | | $N_{12}$ 1.58144 | | $ν_{12}$ 40.83 | |
| | | $r_{22}$ 124.473 | | $d_{22}$ 5.000 | | | | | |
| | | $r_{23}$ −268.353 | | | | | | | |
| | 2 | $r_{24}$ 28.891 | | $d_{23}$ 3.200 | | $N_{13}$ 1.80741 | | $ν_{13}$ 31.59 | |
| | | $r_{25}$ −121.206 | | $d_{24}$ 3.000 | | | | | |
| | | $r_{26}$ −41.107 | | $d_{25}$ 3.000 | | $N_{14}$ 1.54072 | | $ν_{14}$ 47.22 | |
| | | $r_{27}$ 57.651 | | $d_{26}$ 0.200 | | | | | |
| | | $r_{28}$ 38.827 | | $d_{27}$ 1.200 | | $N_{15}$ 1.78831 | | $ν_{15}$ 47.32 | |
| | | $r_{29}$ −130.084 | | $d_{28}$ 4.800 | | $N_{16}$ 1.54072 | | $ν_{16}$ 47.22 | |

TABLE 15

[Embodiment 15]   $f = 35.9 \sim 70.0 \sim 145.5$   $F_{No.} = 3.6 \sim 4.6$

| Group | | r | d | N | ν |
|---|---|---|---|---|---|
| I | | $r_1$ 148.290 | $d_1$ 2.000 | $N_1$ 1.80518 | $ν_1$ 25.43 |
| | | $r_2$ 51.813 | $d_2$ 8.500 | $N_2$ 1.61800 | $ν_2$ 63.45 |
| | | $r_3$ −1263.168 | | | |
| | | $r_4$ 55.317 | $d_3$ 0.150 | | |
| | | $r_5$ 282.255 | $d_4$ 5.300 | $N_3$ 1.77250 | $ν_3$ 49.77 |
| | | | $d_5$ 0.800~15.714~28.905 | | |
| | 1 | $r_6$ 128.508 | $d_6$ 1.200 | $N_4$ 1.77250 | $ν_4$ 49.77 |
| | | $r_7$ 18.068 | $d_7$ 5.200 | | |
| | | $r_8$ −98.383 | | | |
| II | | $r_9$ −24.390 | $d_8$ 3.000 | $N_5$ 1.75000 | $ν_5$ 25.14 |
| | | $r_{10}$ 69.544 | $d_9$ 1.100 | $N_6$ 1.75450 | $ν_6$ 51.57 |
| | | | $d_{10}$ 0.100 | | |

TABLE 15-continued

[Embodiment 15]   $f = 35.9 \sim 70.0 \sim 145.5$   $F_{No.} = 3.6 \sim 4.6$

| Group | | r | d | N | ν |
|---|---|---|---|---|---|
| | 2 | $r_{11}$ 30.920 | $d_{11}$ 2.200 | $N_7$ 1.80518 | $ν_7$ 25.43 |
| | | $r_{12}$ 108.083 | $d_{12}$ 2.600 | | |
| | 3 | $r_{13}$ −29.144 | $d_{13}$ 1.100 | $N_8$ 1.62135 | $ν_8$ 61.28 |
| | | $r_{14}$ −92.923 | | | |
| | | | $d_{14}$ 20.356~10.888~1.000 | | |
| | | $r_{15}$ 97.931 | $d_{15}$ 3.000 | $N_9$ 1.51680 | $ν_9$ 64.12 |
| | | $r_{16}$ −59.862 | $d_{16}$ 0.142 | | |
| | | $r_{17}$ 60.330 | $d_{17}$ 4.000 | $N_{10}$ 1.51680 | $ν_{10}$ 64.12 |
| | 1 | $r_{18}$ −40.504 | | | |
| | | | $d_{18}$ 1.000 | | |
| | | $r_{19}$ −33.013 | $d_{19}$ 1.017 | $N_{11}$ 1.805187 | $ν_{11}$ 25.43 |
| | | $r_{20}$ −171.775 | | | |
| | | | $d_{20}$ 11.300~5.854~2.552 | | |
| III | | $r_{21}$ 32.419 | $d_{21}$ 6.084 | $N_{12}$ 1.60323 | $ν_{12}$ 42.30 |
| | | $r_{22}$ −59.807 | $d_{22}$ 6.981 | | |
| | | $r_{23}$ −40.131 | $d_{23}$ 2.703 | $N_{13}$ 1.83400 | $ν_{13}$ 37.05 |
| | 2 | $r_{24}$ 32.306 | $d_{24}$ 1.933 | | |
| | | $r_{25}$ −236.076 | $d_{25}$ 3.052 | $N_{14}$ 1.51680 | $ν_{14}$ 64.12 |
| | | $r_{26}$ −31.095 | $d_{26}$ 0.142 | | |
| | | $r_{27}$ 49.978 | $d_{27}$ 3.500 | $N_{15}$ 1.51680 | $ν_{15}$ 64.12 |
| | | $r_{28}$ −96.905 | | | |

TABLE 16

[Embodiment 16]   $f = 35.9 \sim 70.0 \sim 145.0$   $F_{No.} = 3.6 \sim 4.6$

| Group | | r | d | N | ν |
|---|---|---|---|---|---|
| I | | $r_1$ 148.290 | $d_1$ 2.000 | $N_1$ 1.80518 | $ν_1$ 25.43 |
| | | $r_2$ 54.945 | $d_2$ 7.000 | $N_2$ 1.61800 | $ν_2$ 63.45 |
| | | $r_3$ 7330.300 | | | |
| | | $r_4$ 57.500 | $d_3$ 0.150 | | |
| | | $r_5$ 270.330 | $d_4$ 5.000 | $N_3$ 1.77250 | $ν_3$ 49.77 |
| | | | $d_5$ 0.800~16.796~31.265 | | |
| | 1 | $r_6$ 144.209 | $d_6$ 1.200 | $N_4$ 1.77250 | $ν_4$ 49.77 |
| | | $r_7$ 17.446 | $d_7$ 5.800 | | |
| | | $r_8$ −82.399 | | | |
| II | | $r_9$ −28.571 | $d_8$ 2.800 | $N_5$ 1.80518 | $ν_5$ 25.43 |
| | | $r_{10}$ 71.180 | $d_9$ 1.100 | $N_6$ 1.77250 | $ν_6$ 49.77 |
| | | | $d_{10}$ 0.100 | | |
| | 2 | $r_{11}$ 31.160 | $d_{11}$ 2.200 | $N_7$ 1.80518 | $ν_7$ 25.43 |
| | | $r_{12}$ 105.637 | $d_{12}$ 2.900 | | |

TABLE 16-continued

[Embodiment 16]
f = 35.9~70.0~145.0   $F_{No.}$ = 3.6~4.6

| | | | | | | | |
|---|---|---|---|---|---|---|---|
| 3 | $r_{13}$ −29.791 | $d_{13}$ 1.100 | $N_8$ | 1.51680 | $\nu_8$ | 64.12 | |
| | $r_{14}$ −59.361 | | | | | | |
| | | $d_{14}$ 22.433~11.598~1.000 | | | | | |
| | $r_{15}$ 73.655 | $d_{15}$ 2.500 | $N_9$ | 1.52133 | $\nu_9$ | 51.06 | |
| | $r_{16}$ −74.723 | $d_{16}$ 0.142 | | | | | |
| | $r_{17}$ 46.590 | | | | | | |
| | | $d_{17}$ 3.500 | $N_{10}$ | 1.51680 | $\nu_{10}$ | 64.12 | |
| | $r_{18}$ −53.564 | $d_{18}$ 0.400 | | | | | |
| | $r_{19}$ −44.323 | | | | | | |
| | | $d_{19}$ 1.200 | $N_{11}$ | 1.80518 | $\nu_{11}$ | 25.43 | |
| | $r_{20}$ −578.288 | | | | | | |
| | | $d_{20}$ 11.000~5.839~1.968 | | | | | |
| III | $r_{21}$ 28.336 | $d_{21}$ 4.889 | $N_{12}$ | 1.58267 | $\nu_{12}$ | 46.43 | |
| | $r_{22}$ −78.124 | $d_{22}$ 5.640 | | | | | |
| 2 | $r_{23}$ −46.293 | $d_{23}$ 2.637 | $N_{13}$ | 1.83400 | $\nu_{13}$ | 37.05 | |
| | $r_{24}$ 27.351 | $d_{24}$ 2.142 | | | | | |
| | $r_{25}$ 11270.140 | | | | | | |
| | $r_{26}$ −30.077 | $d_{25}$ 3.052 | $N_{14}$ | 1051680 | $\nu_{14}$ | 64.12 | |
| | | $d_{26}$ 0.142 | | | | | |
| | $r_{27}$ 51.849 | $d_{27}$ 3.000 | $N_{15}$ | 1.51680 | $\nu_{15}$ | 64.12 | |
| | $r_{28}$ −688.861 | | | | | | |

TABLE 17

[Embodiment 17]
f = 35.9~70.0~131.5   $F_{No.}$ = 3.6~4.6

| | | | | | | | |
|---|---|---|---|---|---|---|---|
| I | $r_1$ 148.290 | $d_1$ 2.000 | $N_1$ | 1.80518 | $\nu_1$ | 25.43 | |
| | $r_2$ 50.000 | $d_2$ 8.400 | $N_2$ | 1.61800 | $\nu_2$ | 63.45 | |
| | $r_3$ −1116.918 | $d_3$ 0.150 | | | | | |
| | $r_4$ 49.222 | $d_4$ 5.800 | $N_3$ | 1.77250 | $\nu_3$ | 49.77 | |
| | $r_5$ 264.280 | | | | | | |
| | | $d_5$ 0.800~14.519~24.858 | | | | | |
| II | 1 | $r_6$ 251.256 | $d_6$ 1.200 | $N_4$ | 1.77250 | $\nu_4$ | 49.77 |
| | | $r_7$ 16.424 | $d_7$ 5.400 | | | | |
| | | $r_8$ −77.830 | | | | | |
| | | $r_9$ −24.390 | $d_8$ 2.800 | $N_5$ | 1.80518 | $\nu_5$ | 25.43 |
| | | $r_{10}$ 66.861 | $d_9$ 1.100 | $N_6$ | 1.77250 | $\nu_6$ | 49.77 |
| | | | $d_{10}$ 0.100 | | | | |
| | 2 | $r_{11}$ 29.323 | $d_{11}$ 2.200 | $N_7$ | 1.80518 | $\nu_7$ | 25.43 |
| | | $r_{12}$ 99.974 | $d_{12}$ 2.700 | | | | |
| | 3 | $r_{13}$ −29.114 | $d_{13}$ 1.100 | $N_8$ | 1.51680 | $\nu_8$ | 64.12 |
| | | $r_{14}$ −65.390 | | | | | |
| | | | $d_{14}$ 19.357~9.960~1.000 | | | | |

TABLE 17-continued

[Embodiment 17]
f = 35.9~70.0~131.5   $F_{No.}$ = 3.6~4.6

| | | | | | | | |
|---|---|---|---|---|---|---|---|
| | $r_{15}$ 84.052 | $d_{15}$ 2.500 | $N_9$ | 1.51680 | $\nu_9$ | 64.12 | |
| | $r_{16}$ −61.039 | $d_{16}$ 0.142 | | | | | |
| | $r_{17}$ 50.927 | | | | | | |
| 1 | $r_{18}$ −48.381 | $d_{17}$ 3.500 | $N_{10}$ | 1.51680 | $\nu_{10}$ | 64.12 | |
| | | $d_{18}$ 0.400 | | | | | |
| | $r_{19}$ −40.239 | | | | | | |
| | $r_{20}$ −277.612 | $d_{19}$ 1.200 | $N_{11}$ | 1.80518 | $\nu_{11}$ | 25.43 | |
| | | $d_{20}$ 9.500~5.178~3.789 | | | | | |
| III | $r_{21}$ 28.906 | $d_{21}$ 6.025 | $N_{12}$ | 1.58267 | $\nu_{12}$ | 46.43 | |
| | $r_{22}$ −75.104 | $d_{22}$ 6.844 | | | | | |
| 2 | $r_{23}$ −41.033 | $d_{23}$ 2.637 | $N_{13}$ | 1.83400 | $\nu_{13}$ | 37.05 | |
| | $r_{24}$ 28.470 | $d_{24}$ 1.933 | | | | | |
| | $r_{25}$ −556.538 | | | | | | |
| | $r_{26}$ −31.915 | $d_{25}$ 3.052 | $N_{14}$ | 1.51680 | $\nu_{14}$ | 64.12 | |
| | $r_{27}$ 49.949 | $d_{26}$ 0.142 | | | | | |
| | $r_{28}$ −102.528 | $d_{26}$ 3.500 | $N_{15}$ | 1.51680 | $\nu_{15}$ | 64.12 | |

In the above embodiments, the eighth to seventeenth embodiments relate to relatively greater zoom ranges. With respect to these embodiments, condition (3) is limited as follows:

$$0.2 < |f_{II}|/f_{II-2} < 0.6 \tag{3'}$$

Further, the eleventh to seventeenth embodiments show especially wide zoom ranges reaching a considerate telephoto field angle. For these embodiments, the present invention provides the following condition:

$$0.07 < |f_{II}|/f_T < 0.15 \tag{9}$$

wherein: $f_T$ represents the longest focal length of the whole lens system.

Condition (9) is for providing a zoom lens system with a high zoom ratio and well corrected aberrations. If the upper limit is violated, any zoom lens system with a high zoom ratio such as about 3 to 6 and a high optical performance would not be attained unless the compactness of the lens system is abandoned. On the other hand, if the lower limit is violated, the desirable balance in correcting various aberrations, especially between the corrections of spherical aberration and coma, would be hardly possible and the correction of the lateral chromatic aberration would also be difficult.

In the drawings, the solid lines below the cross sectional views of the lens systems roughly show the movement of the lens groups upon zooming toward the longest focal length side, while the straight broken lines represent that the corresponding lens groups are left stationary upon zooming. Most of the embodiments belong to a type in which the first positive lens group (I) is moved toward the object side, the second negative lens group (II) is moved toward the image side or left stationary and the third positive lens group (III) is moved toward the object side, upon zooming from the shortest to the longest focal length of the whole lens system, the third positive lens group (III) being divided into two positive subunits (III-1 and III-2) for reducing the air space therebetween in accordance with the increase of the focal length of the whole lens system. These type of embodiments, the object side positive subunit (III-1) in the third positive lens group (III) consists of a pair of positive lens elements and a negative lens element, the two of which may be cemented to form a doublet. Further, the image side positive subunit (III-2) of the third positive lens group (III) in the eighth to seventeenth embodiments is basically of a triplet type with a positive-negative-positive power distribution.

As is apparent from the above disclosure, the present invention provides a compact zoom lens system of a high zoom ratio ranging to a wide field angle with a high optical performance. For example, in the ninth and tenth embodiments, a filter of diameter, 55 $\phi$ can be attached thereto.

As can be readily appreciated, it is possible to deviate from the above embodiments of the present invention and, as will be readily understood by those skilled in the optical art, the invention is capable of many modifications and improvements within the scope and spirit thereof. Accordingly, it will be understood that the invention is not to be limited by these specific embodiments, but only by the scope and spirit of the appended claims.

What is claimed is:

1. A zoom lens system of a relatively high zoom ratio ranging to wideangle photography in which the shortest focal length is less than the length of the diagonal line of the effective image plane, comprising from the object to the image side:
    a first lens group of a positive refractive power;
    a second lens group of a negative refractive power consisting of a first negative subunit, including at least two separate negative lenses, a second positive subunit located on the image side of the first negative subunit with an unchangeable air space and a third negative subunit located on the image side of the second positive subunit with an unchangeable air space; and
    a third lens group of a positive refractive power, wherein at least an air space between the first and second lens groups and an air space between the second and third lens groups are changeable upon zooming.

2. The invention of claim 1, wherein at least one of the two separate negative lenses is a doublet.

3. The invention of claim 1, wherein the absolute value of radius of curvature is less on the image side surface than on the object side surface with respect to the object side one of the two separate negative lenses.

4. The invention of claim 1, wherein the second positive subunit includes at least one positive lens with an object side surface of a lesser absolute value of radius of curvature and an image side surface of a greater absolute value of radius of curvature.

5. The invention of claim 4, wherein the positive lens in the second positive subunit is a doublet.

6. The invention of claim 1, wherein the third negative subunit includes at least one negative lens with an object side surface of a lesser absolute value of radius of curvature and an image side surface of a greater absolute value of radius of curvature.

7. The invention of claim 6, wherein the negative lens in the third negative subunit is a doublet.

8. A zoom lens system of a relatively high zoom ratio ranging to wide angle photography in which the shortest focal length is less than the length of the diagonal line of the effective image plane, comprising from the object to the image side:
    a first lens group of a positive refractive power;
    a second lens group of a negative refractive power consisting of a first negative subunit including at least two separate negative lenses, a second positive subunit located on the image side of the first negative subunit with an unchangeable air space and a third negative subunit located on the image side of the second positive subunit with an unchangeable air space; and
    a third lens group of a positive refractive power, wherein at least an air space between the first and second lens groups and an air space between the second and third lens groups are changeable upon zooming, wherein the whole first lens group is movable for focusing with the other lens groups left stationary.

9. A zoom lens system of a relatively high zoom ratio ranging to wide angle photography in which the shortest focal length is less than the length of the diagonal line of the effective image plane comprising from the object side to the image side:
    a first lens group of a positive refractive power;
    a second lens group of a negative refractive power consisting of a first negative subunit including at least two separate negative lenses, a second positive subunit located on the image side of the first negative subunit with an unchangeable air space and a third negative subunit located on the image side of the second positive subunit with an unchangeable air space; and
    a third lens group of a positive refractive power wherein at least an air space between the first and second lens groups and an air space between the second and third lens groups are changeable upon zooming, wherein the first and third lens groups are movable upon zooming.

10. The invention of claim 9, wherein the second lens group is left stationary upon zooming.

11. The invention of claims 1 or 8 or 9, wherein the third lens group is divided into two subunits, an air space between the two subunits being further changeable upon zooming.

12. A zoom lens system of a relatively high zoom ratio ranging to wide angle photography in which the shortest focal length is less than the length of the diagonal lines of the effective image plane, comprising from the object to the image side:
    a first lens group of a positive refractive power;
    a second lens group of a negative refractive power consisting of a first negative subunit including at least two separate negative lenses, a second positive subunit located on the image side of the first negative subunit with an unchangeable air space and a third negative subunit located on the image side of the second positive subunit with an unchangeable air space; and
    a third lens group of a positive refractive power, wherein at least an air space beween the first and second lens groups and an air space between the second and third lens groups are changeable upon zooming, wherein the lens system fulfills the following conditions:

$$R_a < R_B$$

wherein:
R_a represents the radius of curvature of the most image side surface of the first negative subunit, and
R_b represents the radius of curvature of the most object side surface of the second positive subunit.

13. The invention of claim 12, wherein the lens system further fulfills the following condition:

$$\Phi < 0$$

wherein $\Phi$ represents the refractive power of the air lens formed between the second and positive subunit and the third negative subunit.

14. The invention of claim 12, wherein the lens system further fulfills the following condition:

$$0.6 < |f_{I\,II}|/f_w < 1.2$$

wherein: $f_{I\,II}$ represents the total focal length of the first and second lens groups at the shortest focal length of the whole lens system and $f_w$ represents the shortest focal length of the whole lens system.

15. A zoom lens system of a relatively high zoom ratio ranging to wide angle photography in which the shortest focal length is less than the length of the diagonal line of the effective image plane, comprising from the object to the image side:
   a first lens group of a positive refractive power;
   a second lens group of a negative refractive power consisting of a first negative subunit including at least two separate negative lenses, a second positive subunit located on the image side of the first negative subunit with an air space and a third negative subunit located on the image side of the second positive subunit with an air space; and
   a third lens group of a positive refractive power, wherein at least an air space between the first and second lens groups and an air space between the second and third lens groups are changeable upon zooming, wherein the lens system fulfills the following condition:

$$0.2 < |f_{II}|/f_{II-2} < 0.8$$

wherein:
$f_{II}$ represents the focal length of the second lens group; and
$f_{II-2}$ represents the focal length of the second positive subunit.

16. The invention of claim 15, wherein the condition for $|f_{II}|/f_{II-2}$ is as follows:

$$0.2 < |f_{II}|/f_{II-2} < 0.6$$

17. A zoom lens system of a relatively high zoom ratio ranging to wide angle photography in which the shortest focal length is less than the length of the diagonal line of the effective image plane, comprising from the object to the image side:
   a first lens group of a positive refractive power;
   a second lens group of a negative refractive power consisting of a first negative subunit including at least two separate negative lenses, a second positive subunit located on the image side of the first negative subunit with an unchangeable air space and a third negative subunit located on the image side of the second positive subunit with an unchangeable air space; and
   a third lens group of a positive refractive power, wherein at least an air space between the first and second lens groups and an air space between the second and third lens groups are changeable upon zooming, wherein the lens system fulfills the following conditions:

$$0.4 < f_w/f_I < 0.6$$

wherein:
$f_w$ represents the shortest focal length of the whole lens system; and
$f_I$ represents the focal length of the first lens group.

18. The invention of claim 17, wherein the whole first lens group is movable for focusing with the other lens groups left stationary.

19. A zoom lens system of a relatively high zoom ratio ranging to wide angle photography in which the shortest focal length is less than the length of the diagonal line of the effective image plane, comprising from the object to the image side:
   a first lens group of a positive refractive power;
   a second lens group of a negative refractive power consisting of a first negative subunit including at least two separate negative lenses, a second positive subunit located on the image side of the first negative subunit with an unchangeable air space and a third negative subunit located on the image side of the second positive subunit with an unchangeable air space; and
   a third lens group of a positive refractive power, wherein at least an air space between the first and second lens groups and an air space between the second and third lens groups are changeable upon zooming, wherein the lens system fulfills the following condition:

$$0.6 < |f_{I\,II}|/f_w < 1.2$$

wherein:
$f_{I\,II}$ represents the total focal length of the first and second lens groups at the shortest focal length of the whole lens system; and
$f_w$ represents the shortest focal length of the whole lens system.

20. The invention of claim 19, wherein the lens system fulfills the following conditions:

$$0.07 < |f_{II}|/f_T < 0.15$$

wherein:
$f_{II}$ represents the focal length of the second lens group; and
$f_T$ represents the longest focal length of the whole lens system.

21. The invention of claim 19, wherein the condition for $|f_{I\,II}|/f_w$ is as follows:

$$0.6 < |f_{I\,II}|/f_w < 1.0$$

22. The invention of claim 21, wherein the second lens group is left stationary upon zooming.

23. A zoom lens system of a relatively high zoom ratio ranging to wide angle photography in which the shortest focal length is less than the length of the diagonal line of the effective image plane, comprising from the object to the image side:

a first lens group of a positive refractive power;

a second lens group of a negative refractive power consisting of a first negative subunit including at least two separate negative lenses, a second positive subunit located on the image side of the first negative subunit with an unchangeable air space and a third negative subunit located on the image side of the second positive subunit with an unchangeable air space; and a third lens group of a positive refractive power, wherein at least an air space between the first and second lens groups and an air space between the second and third lens groups are changeable upon zooming, wherein the lens system fulfills the following condition:

$$0.5 < f_{II-1}/f_{II} < 1.2$$

wherein:

$f_{II-1}$ represents the focal length of the first negative subunit; and $f_{II}$ represents the focal length of the second lens group.

24. The invention of claim 23, wherein the condition for $f_{II-1}/f_{II}$ is as follows:

$$0.7 < f_{II-1}/f_{II} < 1.2$$

25. The invention of claim 24, wherein the condition for $f_{II-1}/f_{II}$ is as follows:

$$0.7 < f_{II-1}/f_{II} < 1.0$$

26. The invention of claim 15, wherein the lens system further fulfills the following condition:

$$0.4 < f_w/f_I < 0.6$$

wherein:

$f_w$ represents the shortest focal length of the whole lens system; and $f_I$ represents the focal length of the first lens group.

27. A zoom lens system of a relatively high zoom ratio ranging to wide angle photography comprising the following design parameters:

| | | f = 36.0~60.0~97.0 | | $F_{No.}$ = 3.6~4.6 | | | |
|---|---|---|---|---|---|---|---|
| | | Radius of Curvature | | Axial Distance | Refractive Index | | Abbe Number |
| I | $r_1$ | 73.361 | $d_1$ | 3.500 | $N_1$ 1.69680 | $\nu_1$ | 55.5 |
| | $r_2$ | 126.727 | $d_2$ | 0.100 | | | |
| | $r_3$ | 43.958 | $d_3$ | 1.200 | $N_2$ 1.84666 | $\nu_2$ | 23.9 |
| | $r_4$ | 28.169 | $d_4$ | 8.500 | $N_3$ 1.69680 | $\nu_3$ | 55.5 |
| | $r_5$ | 43.958 | $d_5$ | 0.600~7.989~15.809 | | | |
| II 1 | $r_6$ | 81.163 | $d_6$ | 1.300 | $N_4$ 1.6700 | $\nu_4$ | 57.1 |
| | $r_7$ | 14.454 | $d_7$ | 5.500 | | | |
| | $r_8$ | −140.019 | $d_8$ | 1.000 | $N_5$ 1.67000 | $\nu_5$ | 57.1 |
| | $r_9$ | 29.775 | $d_9$ | 0.100 | | | |
| II 2 | $r_{10}$ | 21.595 | $d_{10}$ | 3.150 | $N_6$ 1.80518 | $\nu_6$ | 25.4 |
| | $r_{11}$ | 54.105 | $d_{11}$ | 1.800 | | | |
| II 3 | $r_{12}$ | −33.009 | $d_{12}$ | 1.000 | $N_7$ 1.67000 | $\nu_7$ | 57.1 |
| | $r_{13}$ | −186.185 | $d_{13}$ | 18.500~9.152~1.861 | | | |
| III 1 | $r_{14}$ | −507.640 | $d_{14}$ | 2.500 | $N_8$ 1.62135 | $\nu_8$ | 61.3 |
| | $r_{15}$ | −34.024 | $d_{15}$ | 0.150 | | | |
| | $r_{16}$ | 17.485 | $d_{16}$ | 6.000 | $N_9$ 1.51454 | $\nu_9$ | 54.7 |
| | $r_{17}$ | −23.105 | $d_{17}$ | 4.000 | $N_{10}$ 1.80741 | $\nu_{10}$ | 31.6 |
| | $r_{18}$ | 57.327 | $d_{18}$ | 10.000~8.300~7.100 | | | |
| III 2 | $r_{19}$ | 364.870 | $d_{19}$ | 4.000 | $N_{11}$ 1.66608 | $\nu_{11}$ | 47.9 |
| | $r_{20}$ | −20.606 | $d_{20}$ | 4.000 | | | |
| | $r_{21}$ | −14.158 | $d_{21}$ | 1.500 | $N_{12}$ 1.80750 | $\nu_{12}$ | 35.5 |
| | $r_{22}$ | −23.398 | | | | | |

* * * * *

UNITED STATES PATENT AND TRADEMARK OFFICE
CERTIFICATE OF CORRECTION

PATENT NO. : 4,494,828
DATED : January 22, 1985
INVENTOR(S) : HISAYUKI MASUMOTO et al.

Page 1 of 2

It is certified that error appears in the above-identified patent and that said Letters Patent is hereby corrected as shown below:

Col. 2, line 24: delete "cion", insert --tion;

delete "subgroup", insert --subunit--.

Col. 6, line 14: delete "subunits", insert --subunit--;

line 67: after "air", delete "unchangeable", before "air", insert --unchangeable--.

Col. 7, line 7: before "one", insert -- -- (space);

Col. 8, line 9: before "lens", insert --first--;

line 59: delete "paralel", insert --parallel--.

Col. 18, Table 11, $r_{27}$: delete "-36.716", insert ---35.716--.

Col. 22, Table 15, $N_{11}$: delete "1.805187", insert --1.80518--.

Col. 23, Table 16, $N_{14}$: delete "1051680", insert --1.51680--.

UNITED STATES PATENT AND TRADEMARK OFFICE
CERTIFICATE OF CORRECTION

PATENT NO. : 4,494,828

DATED : January 22, 1985

INVENTOR(S) : Hisayuki Masumoto et al

It is certified that error appears in the above-identified patent and that said Letters Patent is hereby corrected as shown below:

Col. 25, line 7: "These", should read --In these--;

line 33: "wideangle", should read --wide angle--.

Col. 26, line 54: "lines", should read --line--.

Col. 27, line 4: "$R_a < R_B$" should read --$R_a > R_b$--;

line 17: delete "and";

Col. 30, line 17: "43.958" should read --182.209--.

Signed and Sealed this

Eighth Day of December, 1987

Attest:

DONALD J. QUIGG

Attesting Officer

Commissioner of Patents and Trademarks